(12) United States Patent
Yano et al.

(10) Patent No.: US 8,352,706 B2
(45) Date of Patent: Jan. 8, 2013

(54) MEMORY SYSTEM MANAGING ADDRESS TRANSLATION TABLE AND METHOD OF CONTROLLING THEREOF

(75) Inventors: Hirokuni Yano, Tokyo (JP); Toshikatsu Hida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 617 days.

(21) Appl. No.: 12/563,856

(22) Filed: Sep. 21, 2009

(65) Prior Publication Data

US 2010/0169551 A1 Jul. 1, 2010

(30) Foreign Application Priority Data

Dec. 27, 2008 (JP) ................................. 2008-335567

(51) Int. Cl.
*G06F 12/00* (2006.01)
*G06F 12/02* (2006.01)
*G06F 12/10* (2006.01)

(52) U.S. Cl. ........ 711/206; 711/100; 711/103; 711/154; 711/202; 711/205; 711/207; 711/E12.001; 711/E12.002; 711/E12.061

(58) Field of Classification Search .................. 711/103, 711/154, 202, 205–207, E12.001, E12.002, 711/E12.008, E12.061

See application file for complete search history.

(56) References Cited

U.S. PATENT DOCUMENTS

| 7,016,226 B2 | 3/2006 | Shibata et al. |
| 7,443,724 B2 | 10/2008 | Shibata et al. |
| 2006/0224636 A1 | 10/2006 | Kathuria et al. |
| 2008/0177937 A1 | 7/2008 | Nishihara et al. |
| 2009/0222616 A1 | 9/2009 | Yano et al. |
| 2009/0222617 A1 | 9/2009 | Yano et al. |
| 2009/0222628 A1 | 9/2009 | Yano et al. |
| 2009/0222629 A1 | 9/2009 | Yano et al. |
| 2009/0222636 A1 | 9/2009 | Yano et al. |
| 2009/0228642 A1 | 9/2009 | Yano et al. |
| 2009/0235015 A1 | 9/2009 | Hatsuda et al. |
| 2009/0235016 A1 | 9/2009 | Yano et al. |

FOREIGN PATENT DOCUMENTS

| JP | 2004-192789 | 7/2004 |
| JP | 2005-222202 | 8/2005 |

OTHER PUBLICATIONS

U.S. Appl. No. 12/884,844, filed Sep. 17, 2010, Yano et al.
U.S. Appl. No. 13/052,146, filed Mar. 21, 2011, Ootsuka et al.
U.S. Appl. No. 12/552,461, filed Sep. 2, 2009, Hirokuni Yano, et al.
U.S. Appl. No. 12/529,282, filed Aug. 31, 2009, Toshikatsu Hida, et al.
U.S. Appl. No. 12/551,213, filed Aug. 31, 2009, Shinichi Kanno, et al.
U.S. Appl. No. 12/552,422, filed Sep. 2, 2009, Kazuya Kitsunai, et al.

(Continued)

*Primary Examiner* — Jasmine Song
(74) *Attorney, Agent, or Firm* — Oblon, Spivak, McClelland, Maier & Neustadt, L.L.P.

(57) ABSTRACT

A forward lookup address translation table and a reverse lookup address translation table stored in a nonvolatile second storing unit are transferred as a master table to a volatile first storing unit at a time of start-up. When an event occurs so that the master table needs to be updated, difference information before and after update of any one of the forward lookup address translation table and the reverse lookup address translation table is recorded in the first storing unit as a log, thereby reducing an amount of the log.

21 Claims, 19 Drawing Sheets

OTHER PUBLICATIONS

U.S. Appl. No. 12/529,192, filed Aug. 31, 2009, Junji Yano, et al.
U.S. Appl. No. 12/394,632, filed Feb. 27, 2009, Junji Yano et al.
U.S. Appl. No. 12/529,228, filed Aug. 31, 2009, Junji Yano, et al.
U.S. Appl. No. 12/394,665, filed Feb. 27, 2009, Junji Yano, et al.
U.S. Appl. No. 12/529,270, filed Aug. 31, 2009, Junji Yano, et al.
U.S. Appl. No. 12/529,193, filed Aug. 31, 2009, Junji Yano, et al.
U.S. Appl. No. 12/529,139, filed Aug. 28, 2009, Junji Yano, et al.
U.S. Appl. No. 12/530,467, filed Sep. 9, 2009, Junji Yano, et al.
U.S. Appl. No. 12/529,227, filed Aug. 31, 2009, Junji Yano, et al.
U.S. Appl. No. 12/396,104, filed Mar. 2, 2009, Junji Yano, et al.
U.S. Appl. No. 12/529,127, filed Aug. 28, 2009, Junji Yano, et al.
U.S. Appl. No. 12/529,126, filed Aug. 28, 2009, Junji Yano, et al.
U.S. Appl. No. 12/529,223, filed Aug. 31, 2009, Junji Yano, et al.
U.S. Appl. No. 12/529,145, filed Aug. 28, 2009, Junji Yano, et al.
U.S. Appl. No. 12/529,235, filed Aug. 31, 2009, Junji Yano, et al.
U.S. Appl. No. 12/552,442, filed Sep. 2, 2009, Hirokuni Yano, et al.
U.S. Appl. No. 12/552,403, filed Sep. 2, 2009, Hirokuni Yano, et al.
U.S. Appl. No. 12/552,330, filed Sep. 2, 2009, Hirokuni Yano, et al.
U.S. Appl. No. 12/555,274, filed Sep. 8, 2009, Kanno, et al.
U.S. Appl. No. 13/237,396, filed Sep. 20, 2011, Morita.
U.S. Appl. No. 13/238,675, filed Sep. 21, 2011, Norimatsu, et al.
U.S. Appl. No. 13/326,872, filed Dec. 15, 2011, Hirao, et al.
U.S. Appl. No. 13/328,420, filed Dec. 16, 2011, Yonezawa, et al.
U.S. Appl. No. 13/328,471, filed Dec. 16, 2011, Yano, et al.

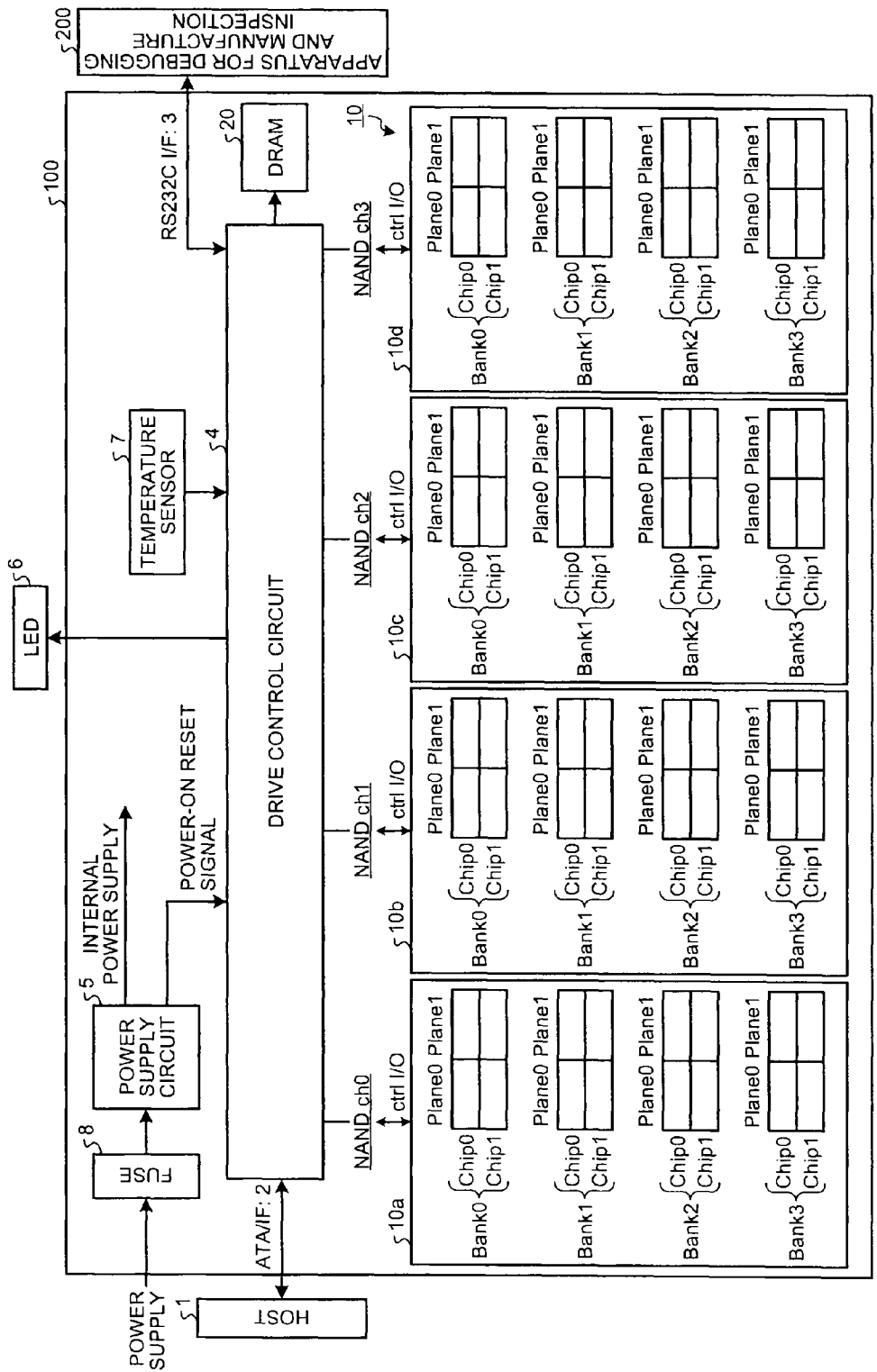

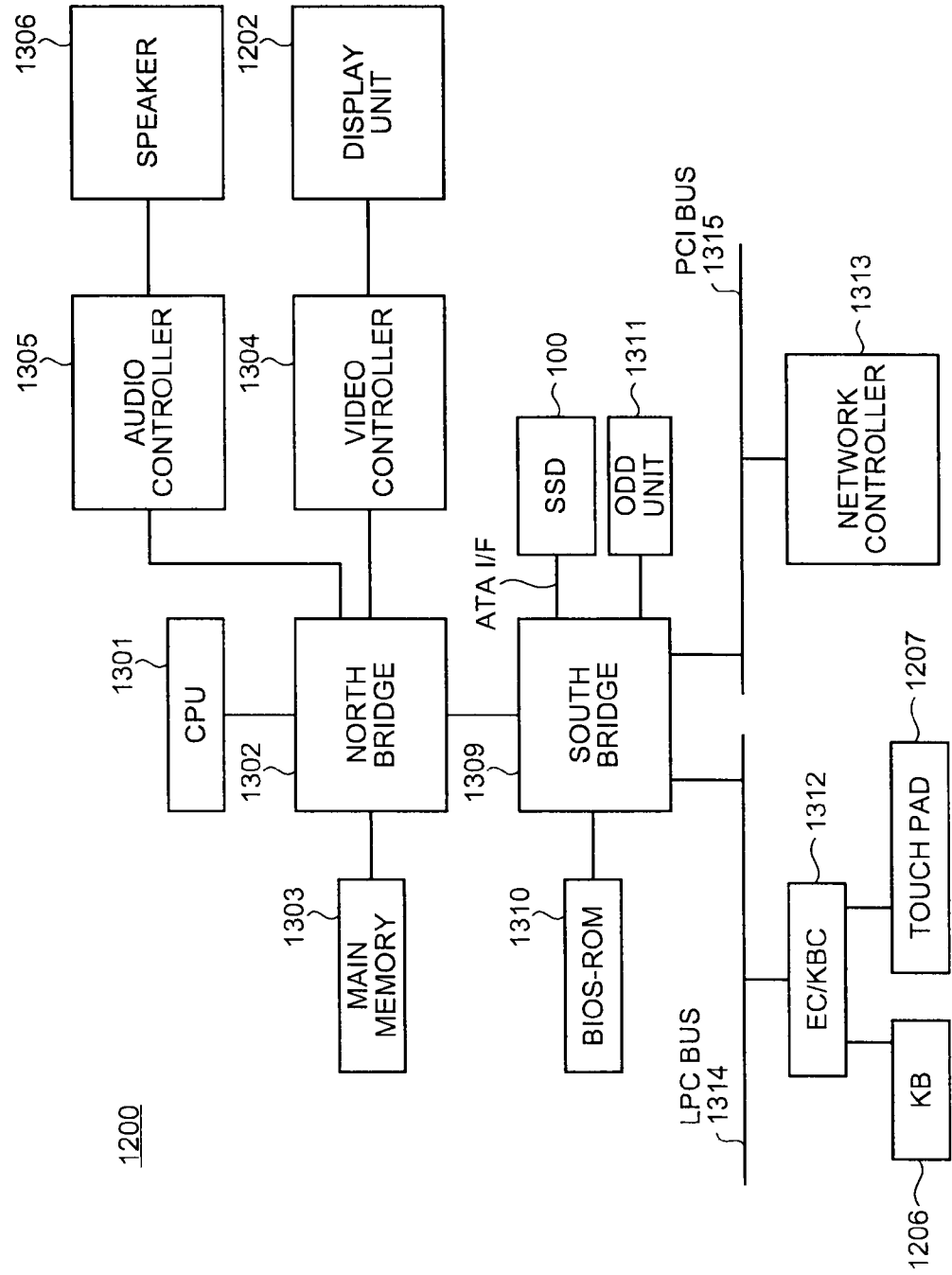

MEMORY SYSTEM MANAGING ADDRESS TRANSLATION TABLE AND METHOD OF CONTROLLING THEREOF

CROSS-REFERENCE TO RELATED APPLICATIONS

This application is based upon and claims the benefit of priority from the prior Japanese Patent Application No. 2008-335567, filed on Dec. 27, 2008; the entire contents of which are incorporated herein by reference.

BACKGROUND OF THE INVENTION

1. Field of the Invention

The present invention relates to a memory system that includes a nonvolatile semiconductor memory and a control method thereof.

2. Description of the Related Art

Some personal computers (PC) employ a hard disk device as a secondary storage device. In such PCs, a technology is known for backing up data that has been stored in the hard disk device to prevent the data from becoming invalid because of some failure. For example, when act of changing data in the hard disk device is detected, a snapshot as a backup copy of the data before the change is taken and a log of changes made to the data is generated. Then, processing for taking a new snapshot, invalidating a log taken in the past before the new snapshot was taken, and generating a new log is repeated at every specific time, which is disclosed, for example, in US Patent Application Publication No. 2006/0224636. In case data becomes invalid due to some reason, the data can be restored by referring to the snapshot and the log.

BRIEF SUMMARY OF THE INVENTION

A memory system according to an embodiment of the present invention comprises: a memory system comprising: a volatile first storing unit; a nonvolatile second storing unit; and a controller that performs data transfer between a host apparatus and the second storing unit via the first storing unit, wherein the second storing unit is capable of storing therein a first address translation table for managing forward lookup information that correlates a logical address specified from the host apparatus with a storing position in the second storing unit, and a second address translation table for managing reverse lookup information that correlates the storing position in the second storing unit with the logical address, and the controller includes a table transferring unit that transfers the first address translation table and the second address translation table stored in the second storing unit to the first storing unit as a master table, a log control unit that, when an event occurs so that the master table needs to be updated, stores therein difference information before and after update of any one of the first address translation table and the second address translation table as a log in the first storing unit, a log reflecting unit that, when a specific first condition is satisfied, stores the log stored in the first storing unit in the second storing unit and reflects the log stored in the first storing unit in the master table stored in the first storing unit, and a read/write control unit that controls the data transfer by using the master table and the log stored in the first storing unit.

BRIEF DESCRIPTION OF THE DRAWINGS

FIG. 1 is a block diagram of a configuration example of an SSD according to a present embodiment of the present invention;

FIG. 17 is a schematic diagram for explaining an accumulation of log, commit processing, a restoring operation, and the like;

FIG. 22 is a schematic diagram of a system configuration example of the PC on which the SSD is mounted.

DETAILED DESCRIPTION OF THE INVENTION

Figure 2A:
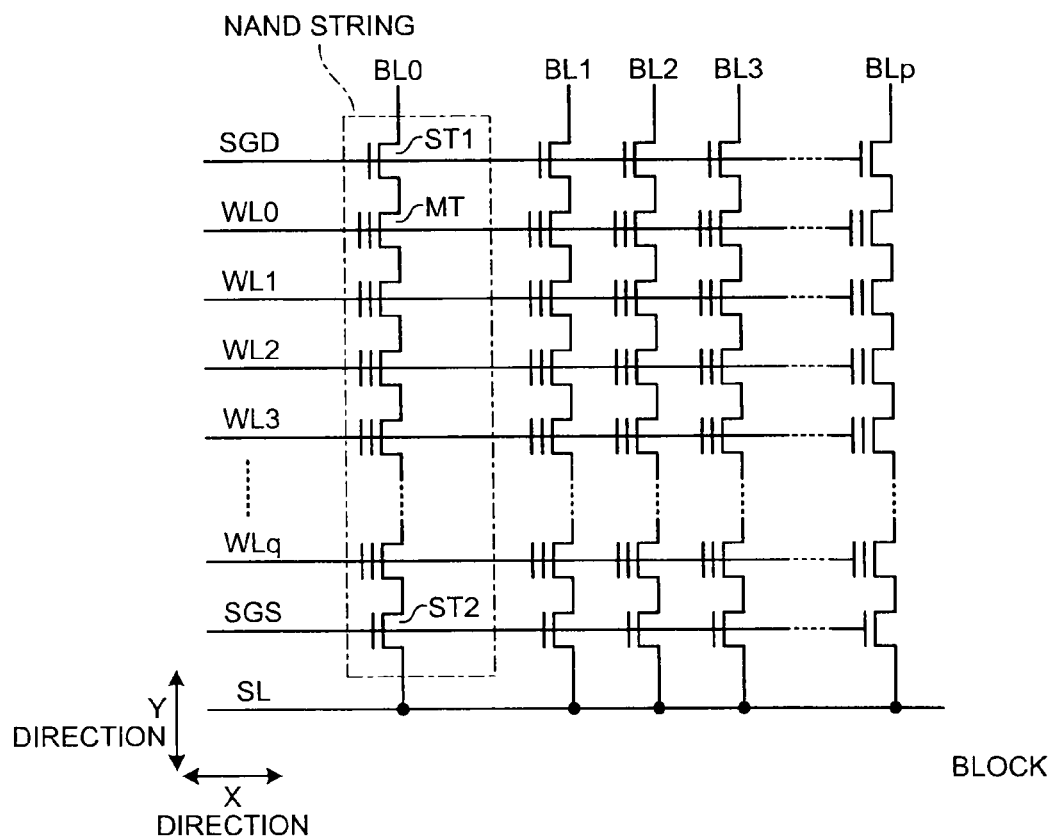
FIG. 2A is a schematic diagram of a configuration example of one block included in a NAND memory chip.

In recent years, a capacity of a NAND-type flash memory as a nonvolatile semiconductor storage device has been increased dramatically. As a result, a Solid State Drive (SSD) as a memory system mounted with a NAND-type flash memory attracts attention. The flash memory has advantages such as high speed and lightweight compared with a magnetic disk device. However, the technology disclosed in US Patent Application Publication No. 2006/0224636 cannot be applied to backup of data stored in such PC having the NAND-type flash memory as the secondary storage device as in the case of backup of data stored in the PC having the hard disk device as the secondary storage device. This is because a multi-value memory technology (multi-level cell (MLC)) that can store a plurality of pieces of data (multi-value data) equal to or larger than 2 bits in one memory cell is employed to increase the capacity of the NAND-type flash memory, which is disclosed, for example, in Japanese Patent Application Laid-open No. 2004-192789.

A memory cell configuring a multi-value memory has a field effect transistor structure having a stacked gate structure in which a gate insulating film, a floating gate electrode, an inter-gate insulating film, and a control gate electrode are stacked in order on a channel region and a plurality of threshold voltages can be set according to the number of electrons accumulated in the floating gate electrode. In order to make it possible to perform multi-value storage based on the plurality of threshold voltages, the distribution of a threshold voltage corresponding to one piece of data needs to be made extremely narrow.

The data recorded by the host apparatus such as the PC has both temporal locality and spatial locality. Therefore, when data is recorded, if the data is directly recorded in an address designated from the outside, rewriting, i.e., erasing processing temporally concentrates in a specific area and a bias in the number of times of erasing increases. Therefore, in the NAND-type flash memory, processing called wear leveling for equally distributing data update sections is performed. In the wear leveling processing, for example, a logical address designated by the host apparatus is translated into a physical address of the nonvolatile semiconductor memory so that the data update sections are equally distributed.

In such address translation, a storing position of data is often managed by using a management table such as an address translation table representing a correspondence relationship between a logical address (LBA) supplied from outside and a physical address (NAND address) indicating a position at which data is stored on a NAND-type flash memory. The management table is loaded from a nonvolatile NAND-type flash memory onto a memory such as a dynamic random access memory (DRAM) at the time of start-up, which is updated every time data is written. The correspondence relationship in the address translation table needs to be backed up, for example, by using a backup technology such as the snapshot and the log for using the correspondence relationship over a power-turn-off.

However, writing speed of a NAND-type flash memory that uses the multi-value memory technology is slow. Therefore, if a parallel writing in a NAND-type flash memory or the like is to be performed for improving performance (speed up) of an SSD on which the NAND-type flash memory is mounted, a data amount to be written in the NAND-type flash memory in certain process units increases, and thus an amount of updates of the address translation table increases by the increased data amount to be written in the NAND-type flash memory, which results in increase in log. Thus, the number of times of writing in the NAND-type flash memory increases due to the increase in the amount of log, and the performance of a memory system degrades.

Exemplary embodiments of a memory system and a method of controlling memory system according to the present invention are described in detail below with reference to the accompanying drawings.

Embodiments of the present invention are explained below with reference to the drawings. In the following explanation, components having the same functions and configurations are denoted by the same reference numerals and signs. Redundant explanation of the components is performed only when necessary.

First, terms used in the specification are defined.

Physical page: A unit that can be collectively written and read out in a NAND-type flash memory.

Logical page: A writing and readout unit set in an SSD. The logical page is associated with one or more physical pages.

Physical block: A minimum unit that can be independently erased in the NAND-type flash memory. The physical block includes a plurality of physical pages.

Logical block: An erasing unit set in the SSD. The logical block is associated with one or more physical blocks. The logical block includes a plurality of logical pages.

Sector: A minimum access unit from a host. A sector size is, for example, 512 bytes (B).

Cluster: A management unit for managing "small data (fine grained data)" in the SSD. A cluster size is equal to or larger than the sector size and is set to be equal to a data management unit of a file system that an operating system (OS) of a host employs or a logical page size. For example, the cluster size can be set such that a size twice or larger natural number times as large as the cluster size is the logical page size.

Track: A management unit for managing "large data (coarse grained data)" in the SSD. A track size is set such that a size twice or larger natural number times as large as the cluster size is the track size. For example, the track size can be set equal to the logical block size.

Free block (FB): A logical block which does not include valid data therein and for which a use is not allocated. The free block includes the following two types, i.e., a complete free block (CFB) and a fragment free block (FFB).

Complete free block (CFB): A free block on which an erasing operation needs to be performed for reuse. After performing the erasing operation, writing can be performed from a logical page positioned at the top of a logical block.

Fragment free block (FFB): A free block in which a logical page with no data written therein remains and which can be reused without performing the erasing operation. Writing can be performed in the remaining logical page with no data written therein.

Bad block (BB): A physical block on the NAND-type flash memory that cannot be used as a storage area because of a large number of errors. For example, a physical block for which the erasing operation is not normally finished is registered as the bad block BB.

Writing efficiency: A statistical value of an erasing amount of the logical block with respect to a data amount written from the host in a specific period. As the writing efficiency is smaller, a wear degree of the NAND-type flash memory is smaller.

Valid cluster: A cluster that stores latest data (cluster-sized data) corresponding to a logical address.

Invalid cluster: A cluster that stores non-latest data (cluster-sized data) not to be referred as a result that data having an identical logical address is written in a different location.

Valid track: A track that stores latest data (track-sized data) corresponding to a logical address.

Invalid track: A track that stores non-latest data (track-sized data) not to be referred as a result that data having an identical logical address is written in a different location.

Multi level cell (MLC) mode: Mode in which writing is normally performed using an upper page and a lower page in a NAND-type flash memory capable of multi-valued storage. A logical block of the MLC mode is associated with one or more physical blocks used in the MLC mode.

Pseudo single level cell (SLC) mode: Mode in which writing is performed using only a lower page in a NAND-type flash memory capable of multi-valued storage. A logical block of the pseudo SLC mode is associated with one or more physical blocks used in the pseudo SLC mode. Even a physical block used once in the pseudo SLC mode can be used in the MLC mode after the erasing operation.

(First Embodiment)

FIG. 1 is a block diagram of a configuration example of an SSD 100 according to a first embodiment of the present invention. The SSD 100 is connected to a host apparatus 1 (hereinafter, host 1) such as a PC or a central processing unit (CPU) core via a memory connection interface such as an advanced technology attachment interface (ATA I/F) 2 and functions as an external storage of the host 1. The SSD 100 can transmit data to and receive data from an apparatus for debugging and manufacture inspection 200 via a communication interface 3 such as an RS232C I/F. The SSD 100 includes a NAND-type flash memory (hereinafter, NAND memory) 10 as a nonvolatile semiconductor memory, a drive control circuit 4 as a controller, a DRAM 20 as a volatile semiconductor memory, a power supply circuit 5, a light-emitting diode (LED) for state display 6, a temperature sensor 7 that detects a temperature in a drive, and a fuse 8.

The power supply circuit 5 generates a plurality of different internal direct current (DC) power supply voltages from external DC power supplied from a power supply circuit on the host 1 side and supplies these internal DC power supply voltages to respective circuits in the SSD 100. The power supply circuit 5 detects a rising edge of an external power supply, generates a power-on reset signal, and supplies the power-on reset signal to the drive control circuit 4. The fuse 8 is provided between the power supply circuit on the host 1 side and the power supply circuit 5 in the SSD 100. When an overcurrent is supplied from an external power supply circuit, the fuse 8 is disconnected to prevent malfunction of the internal circuits.

In this case, the NAND memory 10 includes four parallel operation elements 10*a* to 10*d* that perform four parallel operations. The parallel operation elements 10*a* to 10*d* are connected to the drive control circuit 4 by four channels (ch0 to ch3). Each of the parallel operation elements 10*a* to 10*d* includes a plurality of banks (in this case, four banks (Bank0 to Bank3)) capable of performing bank interleave. Each bank includes a plurality of NAND memory chips (in this case, two memory chips (Chip0 and Chip1)). Each memory chip is divided into, for example, two districts of a plane 0 and a plane 1 each of which includes a plurality of physical blocks. The plane 0 and the plane 1 include peripheral circuits independent from each other (e.g., a row decoder, a column decoder, a page buffer, and a data cache) and can simultaneously perform erasing, writing, and readout by using a double speed mode. In this manner, each NAND memory chip of the NAND memory 10 can perform the parallel operation by a plurality of channels, the bank interleave operation by a plurality of banks, and the parallel operation by the double speed mode using a plurality of planes. Each memory chip can be divided into four planes or be configured without being divided.

The DRAM 20 functions as a cache for data transfer between the host 1 and the NAND memory 10 and a memory for a work area. In the memory for the work area of the DRAM 20, a master table (snapshot) that is obtained by loading various management tables stored in the NAND memory 10 at the time of start-up or the like, log information that is a change difference of a management table, and the like are stored. A ferroelectric random access memory (FeRAM), a magnetoresistive random access memory (MRAM), a phase change random access memory (PRAM), or the like can be used instead of the DRAM 20. The drive control circuit 4 performs data transfer control between the host 1 and the NAND memory 10 via the DRAM 20 and controls the respective components in the SSD 100. The drive control circuit 4 supplies a signal for status display to the LED for state display 6. The drive control circuit 4 also has a function of receiving a power-on reset signal from the power supply circuit 5 and supplying a reset signal and a clock signal to respective units in the own circuit and the SSD 100.

Each of memory cell transistors MT includes a metal oxide semiconductor field effect transistor (MOSFET) including the stacked gate structure formed on a semiconductor substrate. The stacked gate structure includes a charge storage layer (a floating gate electrode) formed on the semiconductor substrate via a gate insulating film and a control gate electrode formed on the charge storage layer via an inter-gate insulating film. In the memory cell transistors MT, a threshold voltage changes according to the number of electrons accumulated in the floating gate electrode. The memory cell transistor MT stores data according to a difference in the threshold voltage. The memory cell transistor MT can be configured to store one bit or can be configured to store multiple values (data equal to or larger than two bits).

The memory cell transistor MT is not limited to the structure having the floating gate electrode and can be the structure such as a metal-oxide-nitride-oxide-silicon (MONOS) type that can adjust a threshold by causing a nitride film interface as a charge storage layer to trap electrons. Similarly, the memory cell transistor MT of the MONOS structure can be configured to store one bit or can be configured to store multiple values (data equal to or larger than two bits).

In each of the NAND strings, (q+1) memory cell transistors MT are arranged between a source of a selection transistor ST1 and a drain of a selection transistor ST2 such that current paths thereof are connected in series. In other words, the memory cell transistors MT are connected in series in a Y direction such that adjacent ones of the memory cell transistors MT share a diffusion region (a source region or a drain region).

Control gate electrodes of the memory cell transistors MT are connected to word lines WL0 to WLq, respectively, in order from the memory cell transistor MT located on the most drain side. Therefore, a drain of the memory cell transistor MT connected to the word line WL0 is connected to the source of the selection transistor ST1. A source of the memory cell transistor MT connected to the word line WLq is connected to the drain of the selection transistor ST2.

The word lines WL0 to WLq connect the control gate electrodes of the memory cell transistors MT in common among the NAND strings in the physical block. In other words, the control gates of the memory cell transistors MT present in an identical row in the block are connected to an identical word line WL. (p+1) memory cell transistors MT connected to the identical word line WL are treated as one page (physical page). Data writing and data readout are performed by each physical page.

The bit lines BL0 to BLp connect drains of selection transistors ST1 in common among the blocks. In other words, the NAND strings present in an identical column in a plurality of blocks are connected to an identical bit line BL.

Figure 2B:
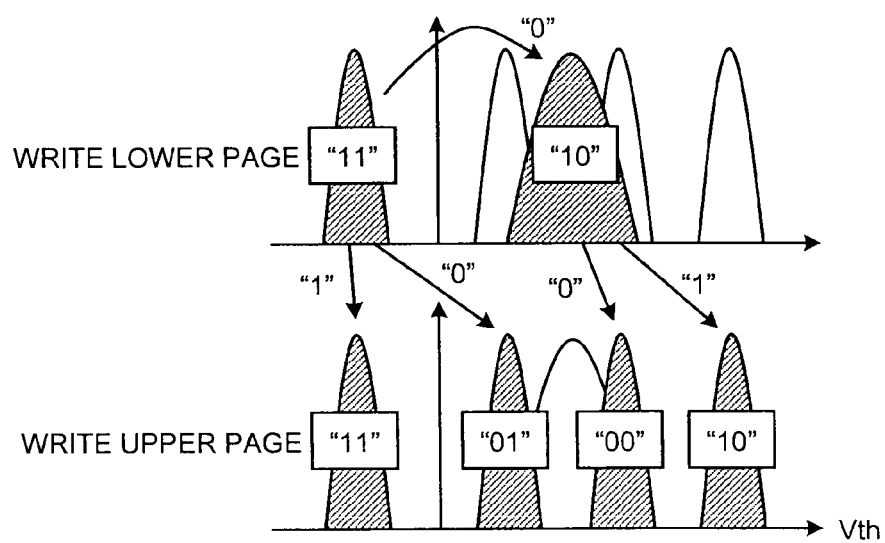
FIG. 2B is a schematic diagram illustrating a threshold distribution in a quaternary data storage system.

FIG. 2B is a schematic diagram of a threshold distribution, for example, in a quaternary data storage mode for storing two bits in one memory cell transistor MT. In the quaternary data storage mode, any one of quaternary data "xy" defined by upper page data "x" and lower page data "y" can be stored in the memory cell transistor MT.

As the quaternary data "xy", for example, "11", "01", "00", and "10" are allocated in order of threshold voltages of the memory cell transistor MT. The data "11" is an erased state in which the threshold voltage of the memory cell transistor MT is negative. The rule of allocation of data is not limited thereto. The configuration can be such that three or more bits are stored in one memory cell transistor MT.

In a lower page writing operation, the data "10" is selectively written in the memory cell transistor MT having the data "11" (in the erased state) according to the writing of the lower bit data "y". A threshold distribution of the data "10" before upper page writing is located about in the middle of threshold distributions of the data "01" and the data "00" after the upper page writing and can be broader than a threshold distribution after the upper page writing. In an upper page writing operation, writing of upper bit data "x" is selectively applied to a memory cell of the data "11" and a memory cell of the data "10". The data "01" and the data "00" are written in the memory cells. In the pseudo SLC mode, writing is performed using only the lower page. The lower page writing is faster than the upper page writing.

Figure 3:
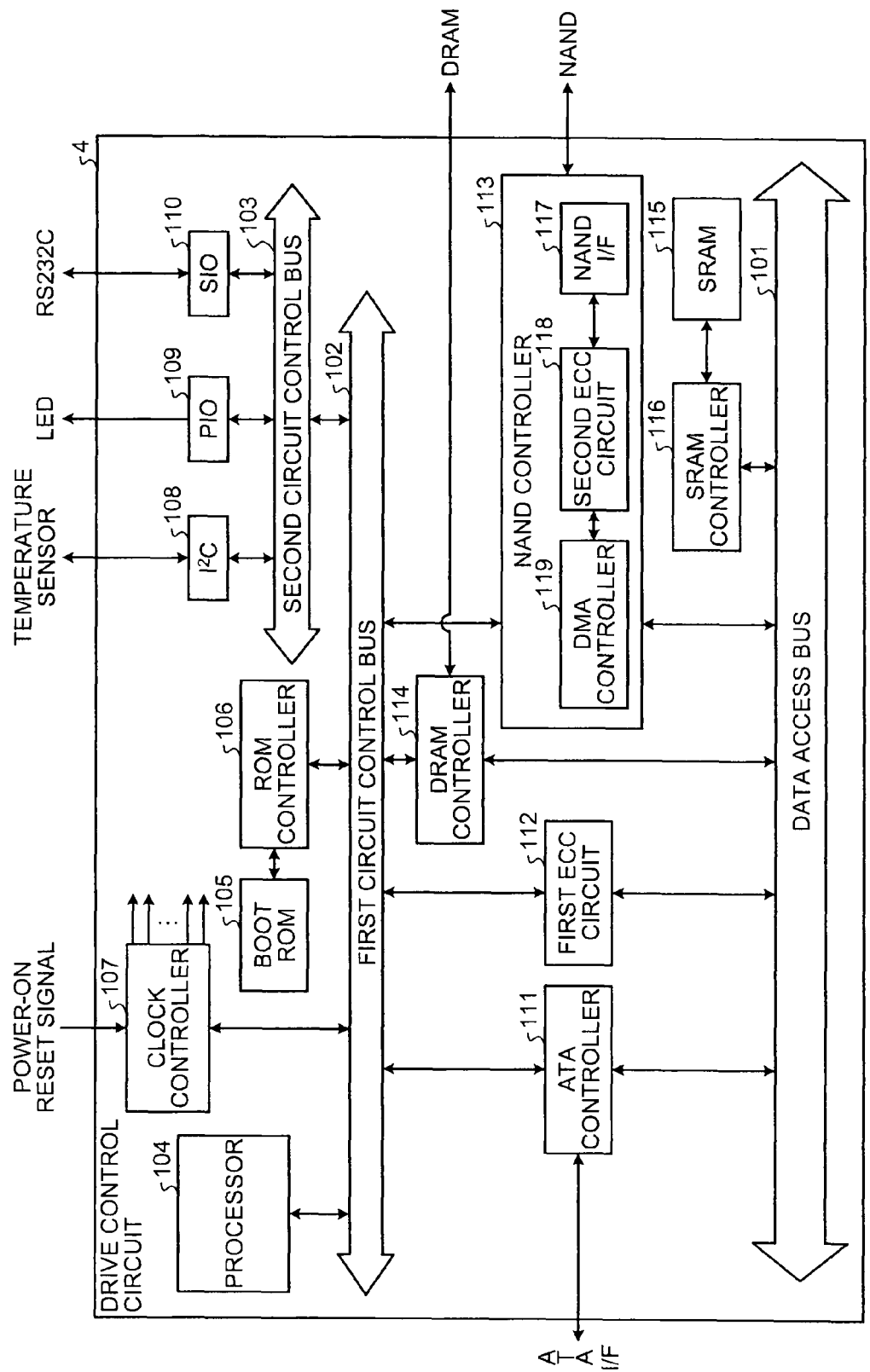
FIG. 3 is a block diagram of a hardware internal configuration example of a drive control circuit shown in FIG. 1.

FIG. 3 is a block diagram of a hardware internal configuration example of the drive control circuit 4. The drive control circuit 4 includes a data access bus 101, a first circuit control bus 102, and a second circuit control bus 103. A processor 104 that controls the entire drive control circuit 4 is connected to the first circuit control bus 102. A boot ROM 105, in which a boot program for booting respective management programs (FW: firmware) stored in the NAND memory 10 is stored, is connected to the first circuit control bus 102 via a ROM controller 106. A clock controller 107 that receives the power-on rest signal from the power supply circuit 5 shown in FIG. 1 and supplies a reset signal and a clock signal to the respective units is connected to the first circuit control bus 102.

The second circuit control bus 103 is connected to the first circuit control bus 102. An I²C circuit 108 for receiving data from the temperature sensor 7 shown in FIG. 1, a parallel IO (PIO) circuit 109 that supplies a signal for status display to the LED for state display 6, and a serial IO (SIO) circuit 110 that controls the RS232C I/F 3 are connected to the second circuit control bus 103.

An ATA interface controller (ATA controller) 111, a first error checking and correction (ECC) circuit 112, a NAND controller 113, and a DRAM controller 114 are connected to both the data access bus 101 and the first circuit control bus 102. The ATA controller 111 transmits data to and receives data from the host 1 via the ATA interface 2. A static random access memory (SRAM) 115 used as a data work area and a firmware expansion area is connected to the data access bus 101 via an SRAM controller 116. When the firmware stored in the NAND memory 10 is started, the firmware is transferred to the SRAM 115 by the boot program stored in the boot ROM 105.

The NAND controller 113 includes a NAND I/F 117 that performs interface processing for interface with the NAND memory 10, a second ECC circuit 118, and a direct memory access (DMA) controller for DMA transfer control 119 that performs access control between the NAND memory 10 and the DRAM 20. The second ECC circuit 118 performs encode of a second correction code and performs encode and decode of a first error correction code. The first ECC circuit 112 performs decode of a second error correction code. The first error correction code and the second error correction code are, for example, a Hamming code, a Bose Chaudhuri Hocquenghem (BCH) code, a Reed Solomon (RS) code, or a low density parity check (LDPC) code. Correction ability of the second error correction code is higher than correction ability of the first error correction code. A technology related to such error correction is disclosed, for example, in International Patent Application PCT/JP2008/063344 or International Patent Application PCT/JP2008/063345 by the same applicant, and the whole content thereof is incorporated in the present application.

As shown in FIG. 1, in the NAND memory 10, the four parallel operation elements 10a to 10d are connected in parallel to the NAND controller 113 in the drive control circuit 4 via four channels (4ch) each for a plurality of bits, so that the four parallel operation elements 10a to 10d can be actuated in parallel. The NAND memory 10 of each channel is divided into four banks capable of the bank interleave, and can access to the plane 0 and the plane 1 of each memory chip simultaneously. Therefore, processing such as writing can be performed almost simultaneously on eight physical blocks (4 banks×2 planes) at the maximum for each channel.

Figure 4:
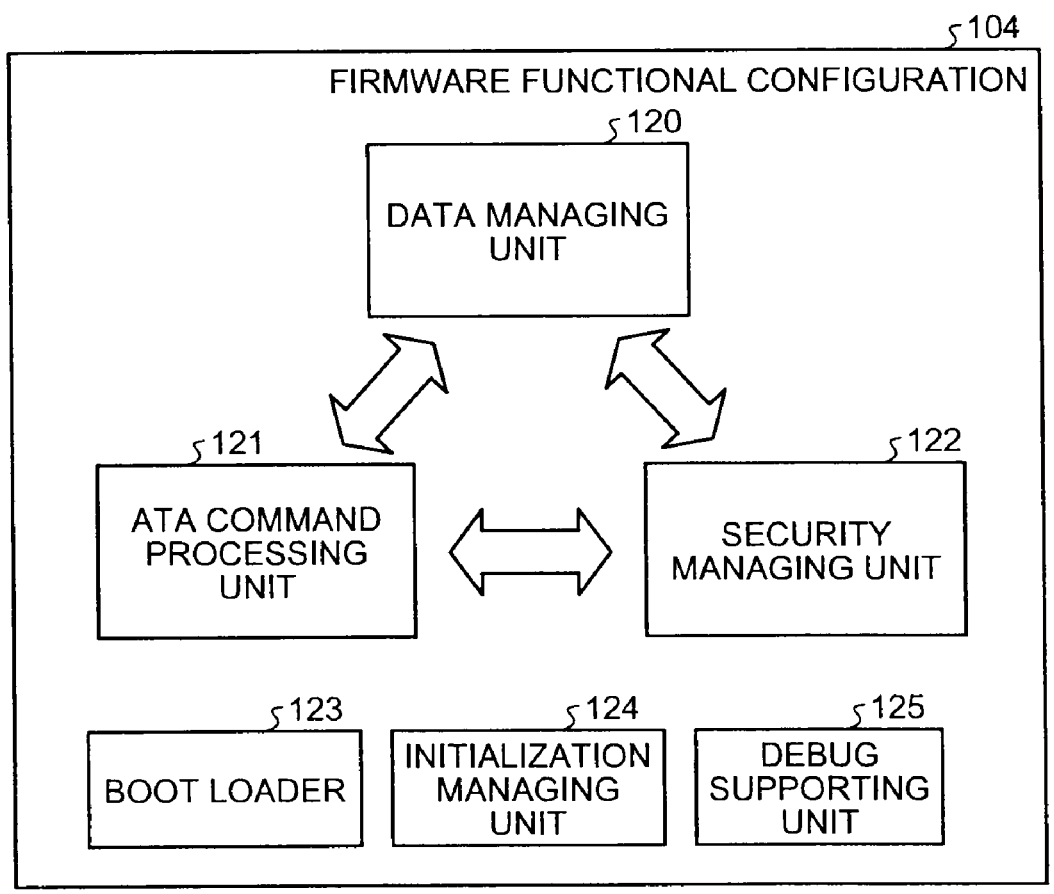
FIG. 4 is a block diagram of a functional configuration example of a processor shown in FIG. 3.

FIG. 4 is a block diagram of a functional configuration example of a firmware realized by the processor 104. Functions of the firmware realized by the processor 104 are roughly classified into a data managing unit 120, an ATA-command processing unit 121, a security managing unit 122, a boot loader 123, an initialization managing unit 124, and a debug supporting unit 125.

The data managing unit 120 controls data transfer between the NAND memory 10 and the DRAM 20 and various functions concerning the NAND memory 10 via the NAND controller 113 and the first ECC circuit 112. The ATA-command processing unit 121 performs data transfer processing between the DRAM 20 and the host 1 in cooperation with the data managing unit 120 via the ATA controller 111 and the DRAM controller 114. The security managing unit 122 manages various kinds of security information in cooperation with the data managing unit 120 and the ATA-command processing unit 121.

The boot loader 123 loads, when a power supply is turned on, the management programs (firmware) from the NAND memory 10 onto the SRAM 115. The initialization managing unit 124 performs initialization of respective controllers and circuits in the drive control circuit 4. The debug supporting unit 125 processes data for debug supplied from the outside via the RS232C interface. The data managing unit 120, the ATA-command processing unit 121, and the security managing unit 122 are mainly functional units realized by the processor 104 executing the management programs stored in the SRAM 115.

In the present embodiment, functions realized by the data managing unit 120 are mainly explained. The data managing unit 120 performs, for example, provision of functions that the ATA-command processing unit 121 requests the NAND memory 10 and the DRAM 20 as storage devices (in response to various commands such as a Write request, a Cache Flush request, and a Read request from the host), management of a correspondence relation between a logical address given from the host 1 and a physical address of the NAND memory 10, protection of management information by a snapshot and a log, provision of fast and highly efficient data readout and writing functions using the DRAM 20 and the NAND memory 10, and ensuring of reliability of the NAND memory 10.

Figure 5:
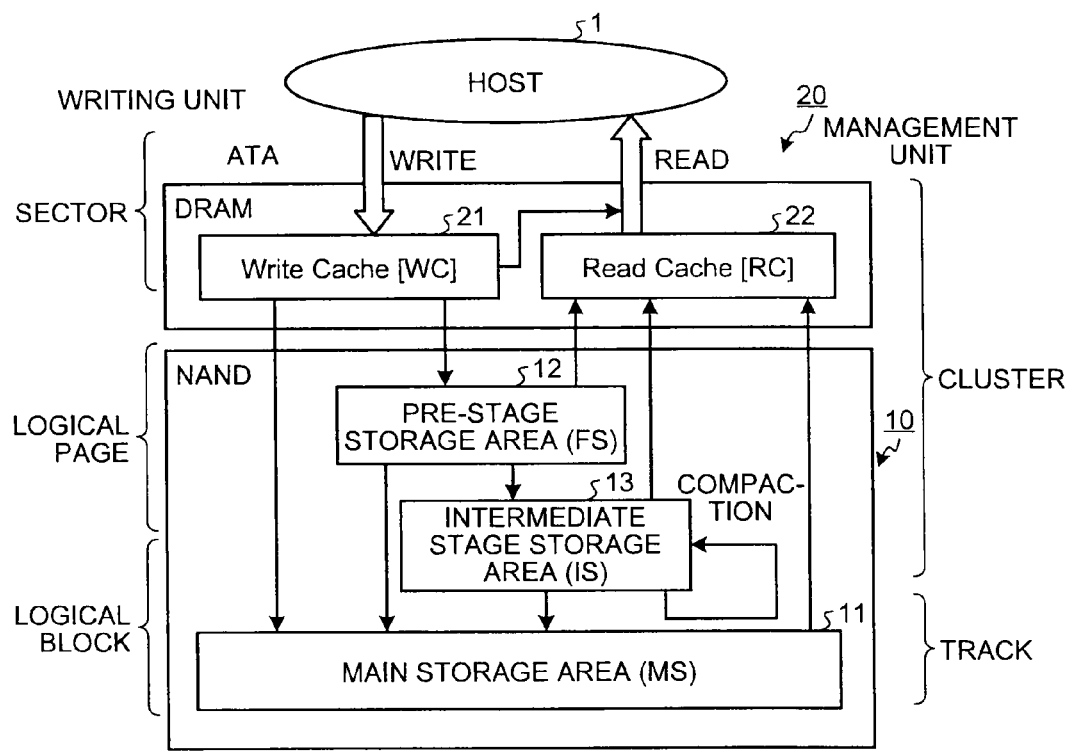
FIG. 5 is a block diagram of a functional configuration formed in a NAND memory and a DRAM shown in FIG. 1.

FIG. 5 is a schematic diagram of functional blocks formed in the NAND memory 10 and the DRAM 20. A write cache (WC) 21 and a read cache (RC) 22 configured on the DRAM 20 are interposed between the host 1 and the NAND memory 10. The WC 21 temporarily stores therein Write data from the host 1. The RC 22 temporarily stores therein Read data from the NAND memory 10. The blocks in the NAND memory 10 are allocated to respective management areas of a pre-stage storage area (FS: Front Storage) 12, an intermediate stage storage area (IS: Intermediate Storage) 13, and a main storage area (MS: Main Storage) 11 by the data managing unit 120 in order to reduce an amount of erasing for the NAND memory 10 during writing. The FS 12 manages data from the WC 21 in cluster units, i.e., "small units" and stores small data for a short period. The IS 13 manages data overflowing from the FS 12 in cluster units (first management units), i.e., "small units" and stores small data for a long period. The MS 11 manages data from the WC 21, the FS 12, and the IS 13 in track units (second management units), i.e., "large units". A technology for managing blocks in the NAND memory 10 by allocating them in each management area in this manner is disclosed, for example, in International Patent Application PCT/JP2008/073950 or International Patent Application PCT/JP2008/067600 by the same applicant, and the whole content thereof is incorporated in the present application.

Figure 6:
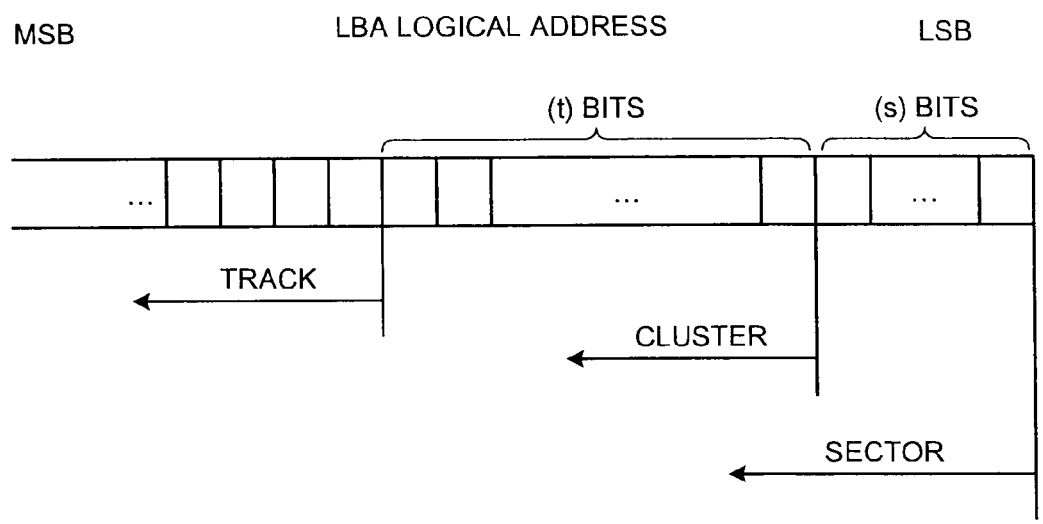
FIG. 6 is a schematic diagram of an LBA logical address.

Specific functional configurations of the respective components shown in FIG. 5 are explained in detail. When the host 1 performs Read or Write for the SSD 100, the host 1 inputs logical block addressing (LBA) as a logical address via the ATA I/F 2. As shown in FIG. 6, the LBA is a logical address in which serial numbers from zero are attached to sectors (size: 512 B). In the present embodiment, as management units for the WC 21, the RC 22, the FS 12, the IS 13, and the MS 11, which are the components shown in FIG. 5, a logical cluster address formed of a bit string equal to or higher in order than a low-order (s+1)th bit of the LBA and a logical track address formed of a bit string equal to or higher in order than a low-order (s+t+1)th bit of the LBA are defined. In the present embodiment, the size of a track and a logical block is the same. A logical block is a virtual block associated with a plurality of physical blocks on a chip of the NAND memory 10. In the present embodiment, a logical block is associated with physical blocks for the number of parallel channels (in this case, four channels as shown in FIG. 1). In the similar manner, a logical page is associated with physical pages for four channels. A logical block is selected from physical blocks belonging to the same bank for efficiently using the bank interleave.

<Read Cache (RC) 22>

The RC 22 is an area for temporarily storing, in response to a Read request from the host 1, Read data from the NAND memory 10 (the FS 12, the IS 13, and the MS 11). Data transfer to the host 1 is basically performed from the RC 22. When data writing is performed from the WC 21 to the NAND memory 10, data on the RC 22 of the same logical address is invalidated.

<Write Cache (WC) 21>

The WC 21 is an area for temporarily storing, in response to a Write request from the host 1, Write data from the host 1. Data on the WC 21 is managed in cluster units, and writing and management of valid data are performed in sector units. When a resource of the WC 21 becomes insufficient, data stored on the WC 21 is flushed to the NAND memory 10. When writing is performed to the logical address same as that of data on the RC 22 from the host 1, the latest data is stored on the WC 21. Therefore, when there is data corresponding to the same logical address on the WC 21, the RC 22, and the NAND memory 10, the data is new in the order of the WC 21, the RC 22, and the NAND memory 10, so that the data on the WC 21 is prioritized to be returned to the host 1.

<Main Storage Area (MS) 11> (Second Management Storage Area)

The MS 11 performs data management in track units, and most user data is stored in the MS 11. A track (high-density track) that has many valid clusters on the WC 21 is directly written from the WC 21 to the MS 11. Moreover, data that cannot be managed by the FS 12 and the IS 13 is input to the MS 11. A track of which LBA is the same as a track input to the MS 11 is invalidated in a logical block, and this logical block is released. A cluster that belongs to the track of which LBA is the same as the track input to the MS 11 is invalidated in a logical block, and a logical block in which all clusters are invalidated is released. The MS 11 consists of a plurality of logical blocks of the MLC mode. In the present embodiment, the size of a track and a logical block is the same, so that additional recording processing performed in the FS 12 or the IS 13 and compaction (processing for collecting only valid clusters to generate a new logical block and releasing an invalid cluster part) performed in the IS 13 are unnecessary in the MS 11. If the track size is smaller than the logical block size, the additional recording processing performed in the FS 12 and the IS 13 and the compaction performed in the IS 13 can be applied to the MS 11.

<Pre-Stage Storage Area (FS) 12> (First Management Storage Area)

The FS 12 is a buffer that adapts a first-in first-out (FIFO) structure in which data is managed in cluster units, and input is performed in units of logical page in which a plurality of clusters is collected. A track (low-density track) with smaller number of valid clusters on the WC 21 is first written on the FS 12. The FS 12 has the FIFO structure in which logical blocks are arranged in the order of data writing. When a cluster of which LBA is the same as a cluster present in the FS 12 is input to the FS 12, it is sufficient to invalidate the cluster in the FS 12, and rewriting is not performed. The cluster of which LBA is the same as the cluster input to the FS 12 is invalidated in a logical block, and a logical block in which all clusters in the logical block are invalidated is released. A cluster stored in a logical block that reaches the end of the FIFO structure of the FS 12 is regarded as a cluster with low possibility of rewriting from the host 1 and the logical block as a whole is moved to the IS 13 under the management of the IS 13. In the present embodiment, the FS 12 consists of a plurality of logical blocks of the pseudo SLC mode to speed up writing. The FS 12 can consist of a plurality of logical blocks of the MLC mode. Data with a high update frequency is invalidated when passing through the FS 12 and only data with low update frequency overflows from the FS 12, so that the FS 12 can separate data with low update frequency from data with high update frequency. Consequently, it is possible to lower the possibility that the compaction occurs frequently in the IS 13 of a subsequent stage.

<Intermediate Stage Storage Area (IS) 13> (Third Management Storage Area)

The IS 13 is a buffer for storing a cluster with low possibility of rewriting, and management of data is performed in cluster units in the same manner as the FS 12. When a cluster of which LBA is the same as a cluster present in the IS 13 is input to the FS 12 and the IS 13, it is sufficient to invalidate the cluster in the IS 13, and rewriting is not performed. In the similar manner to the FS 12, the IS 13 has a list structure in which logical blocks are arranged in order from a logical block on which data is written first (from a logical block that is moved from the FS 12 first); however the IS 13 performs the compaction, which is different from the FS 12. When the capacity of the IS 13 is saturated or management tables for the FS 12 and the IS 13 are saturated, the compaction (collecting valid clusters from the IS 13 and rewriting it to the IS 13) or a defragmentation (integrating clusters of the FS 12 and the IS 13 into a track and flushing it to the MS 11) is performed. In the present embodiment, the IS 13 consists of a mixture of logical blocks of the MLC mode and the pseudo SLC mode. In other words, a block moved from the FS 12 to the IS 13 is a logical block of the pseudo SLC mode; however, the block is rewritten to a logical block of the MLC mode when performing the compaction in the IS 13. When the FS 12 consists of logical blocks of the MLC mode, the IS 13 also consists of only logical blocks of the MLC mode.

Figure 7:
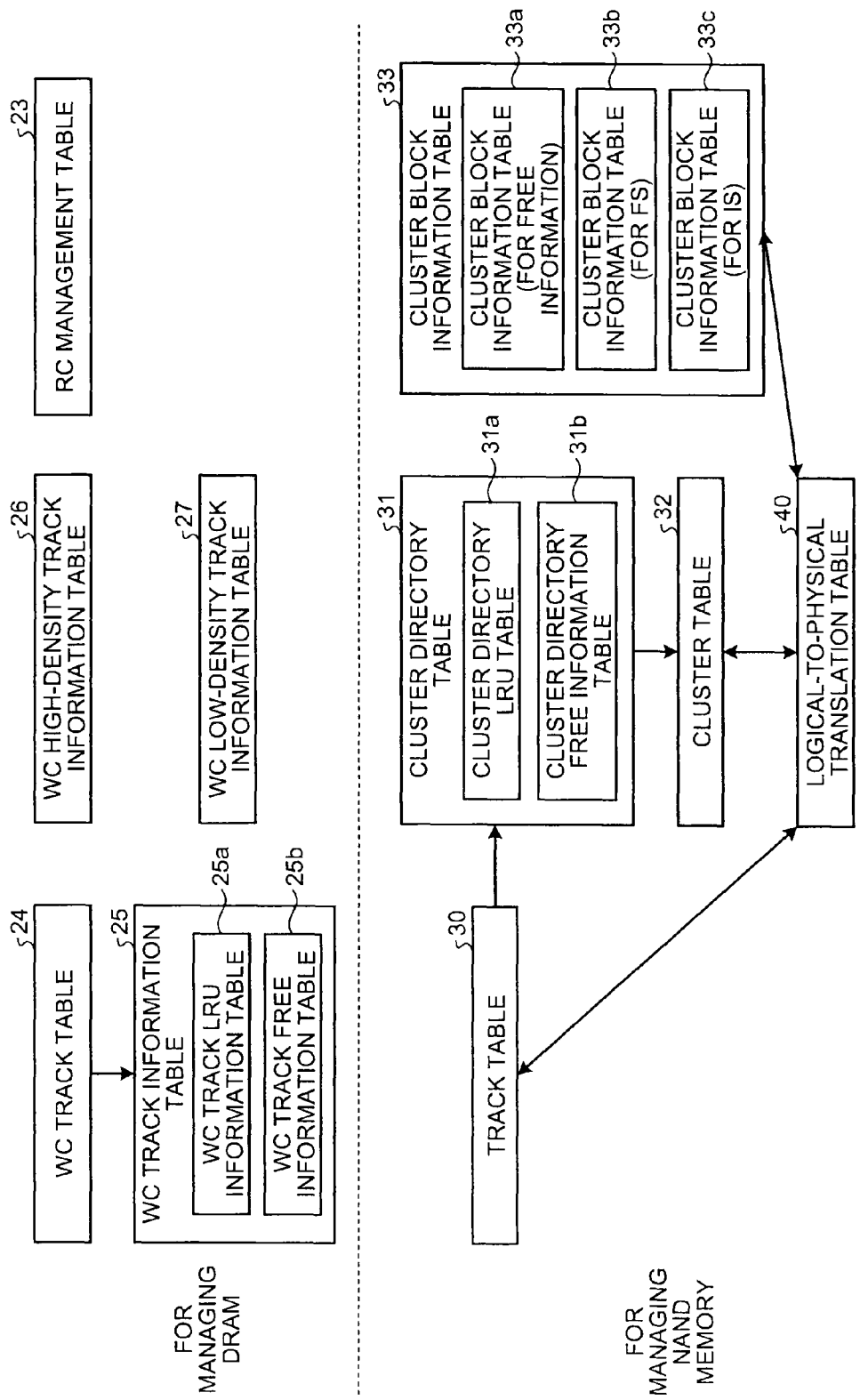
FIG. 7 is a schematic diagram of a configuration example of a management table in a data managing unit shown in FIG. 4.

FIG. 7 is a schematic diagram of management tables for the data managing unit 120 to control and manage the respective components shown in FIG. 5. The table for managing the DRAM 20 includes a RC management table 23, a WC track table 24, a WC track information table 25, a WC high-density track information table 26, and a WC low-density track information table 27. The table for managing the NAND memory 10 includes a track table 30, a cluster directory table 31, a cluster table 32, a cluster block information table 33, and a logical-to-physical translation table 40. The table for managing the NAND memory 10 is classified into a table referred to in a forward lookup address translation and a table referred to in a reverse lookup address translation. The forward lookup address translation is to obtain (logical block address+cluster position) at which data is actually stored from LBA of the data. The reverse lookup address translation is to obtain LBA of data from (logical block address+cluster position).

<RC Management Table 23>

The RC management table 23 is for managing data transferred from the NAND memory 10 to the RC 22.

<WC Track Table 24>

The WC track table 24 is a hash table to look up WC track information concerning data stored on the WC 21 from LBA, and includes a plurality of entries (tags) for each index that is a few bits of least significant bits (LSB) of a track address of the LBA. Each tag stores an LBA track address and a pointer to the WC track information corresponding to the track address.

<WC Track Information Table 25>

The WC track information table 25 includes a WC track least recently used (LRU) information table 25a for managing the time ordering of accessed WC track information by a double-linked list using LRU and a WC track free information table 25b that manages a free WC track information number. When data is flushed from the WC 21 to the NAND memory 10, the oldest accessed track is taken by using the WC track LRU information table 25a.

WC track information corresponds to one of a plurality of tracks present in the WC 21.

WC track information includes (1) a track address present in the WC 21, the number of valid clusters on the WC 21 in a track, information indicating whether each cluster is valid, and cluster position information indicating a position of each cluster in the WC 21, (2) information (sector bitmap) indicating a sector that stores valid data among a plurality of sectors included in one cluster, and (3) track status information (e.g., valid, invalid, during data transfer from ATA, and during writing in the NAND memory). In the WC track information, LSB (t) bits of a cluster address present in the own track are managed at a storage position at which a valid cluster is present; however, the method of managing a cluster address is arbitrary. For example, the LSB (t) bits themselves of the cluster address present in the own track can be managed (see FIG. 6).

<WC High-Density Track Information Table 26>

The WC high-density track information table 26 is for managing high-density (the number of valid clusters in a track is equal to or more than a specific percentage) track information to be written on the MS 11 and manages WC track information concerning a high-density track and the number thereof.

<WC Low-Density Track Information Table 27>

The WC low-density track information table 27 is for managing low-density (the number of valid clusters in a track is less than a specific percentage) track information to be written in the FS 12 and manages the total number of clusters of a low-density track.

<Track Table 30 (Forward Lookup)>

The track table 30 is a table for obtaining track information from a track address of LBA. Track information includes (1) a logical block address (information indicating a logical block in which data of a track is stored), (2) a cluster directory number (information that becomes valid when at least part of data in a track is stored in the FS 12 or the IS 13 and that indicates a table number of a cluster directory table that is present for each track when data in a track is stored in the FS 12 or the IS 13), and (3) the number of FS/IS clusters (information that indicates the number of clusters in a track stored in the FS 12 or the IS 13 and is used for determining whether to perform the defragmentation).

<Cluster Directory Table 31 (Forward Lookup)>

The cluster directory table 31 is an intermediate table for tracing to a logical block when data in a track is stored in the FS 12 or the IS 13. The cluster directory table 31 is provided for each track. Cluster directory information registered in each cluster directory table 31 consists of an array of information (cluster table number information) indicating a table number of the cluster table 32. One piece of information is selected from among a plurality of pieces of the cluster table number information arrayed in one cluster directory table 31 by upper few bits in LSB (t) bits of a cluster address of LBA.

The cluster directory table 31 includes a cluster directory LRU table 31a for managing the time ordering of cluster directory information (array of cluster table number information) together with a corresponding track address with a writing time as a reference by a double-linked list using LRU and a cluster directory free information table 31b that manages a free cluster directory together with a corresponding track address by a double-linked list.

<Cluster Table 32 (Forward Lookup)>

The cluster table 32 is a table that relates to the cluster directory table 31 and manages a cluster position in a logical block at which data is stored when the data in a track is stored in the FS 12 or the IS 13. The cluster table 32 is referred to from the track table 30 indirectly via the cluster directory table 31. The cluster table 32 is actually an array of (logical block address+cluster position) for a plurality of clusters. One piece of information is selected from among a plurality of pieces of (logical block address+cluster position) arrayed in one cluster table 32 by lower few bits in LSB (t) bits of a cluster address of LBA. The cluster table 32 also includes a cluster block information number and information about a cluster position therein as an array.

<Cluster Block Information Table 33 (Reverse Lookup)>

The cluster block is a block that stores data in cluster units among logical blocks. Cluster block information is information for managing logical blocks of the FS 12 and the IS 13 and indicates a type of a cluster present in the logical blocks. A plurality of the cluster block information is coupled in the order of FIFO in the FS 12 and the IS 13 as a double-linked list.

Cluster block information includes (1) a logical block address, (2) the number of valid clusters, and (3) LBA of a cluster included in a logical block.

The cluster block information table 33 includes a cluster block information table 33a for managing free information, a cluster block information table 33b for the FS 12, and a cluster block information table 33c for the IS 13. The cluster block information table 33a manages unused cluster block information, the cluster block information table 33b manages cluster block information included in the FS 12, and the cluster block information table 33c manages cluster block information included in the IS 13. Each of the cluster block information tables 33a to 33c is managed as a double-linked list. The principal use of the reverse lookup address translation is the compaction of the IS 13. The reverse lookup address translation is used to check a type of a cluster stored in a logical block as a compaction target and rewrite data to a different location. Therefore, in the present embodiment, the reverse lookup address translation targets only the FS 12 and the IS 13 that store data in cluster units.

<Logical-to-Physical Translation Table 40 (Forward Lookup)>

The logical-to-physical translation table 40 is a table for managing information concerning translation between a logical block address and a physical block address and the life. The logical-to-physical translation table 40 includes information indicating a plurality of physical block addresses belonging to a logical block, information indicating the number of times of erasing of a logical block address, and information about a cluster block information number, for each logical block address. For rewriting data of a certain LBA to a different location, the LBA in an original cluster block needs to be invalidated, so that it is needed to trace to a cluster block from the LBA. Therefore, an identifier of cluster block information is stored in management information of a logical block managed by the logical-to-physical translation table 40.

(Snapshot and Log)

With the management information managed by each management table, LBA used in the host 1, a logical NAND address (logical block address+offset) used in the SSD 100, and a physical NAND address (physical block address+offset) used in the NAND memory 10 can be associated with each other, so that data exchange between the host 1 and the NAND memory 10 can be performed.

The tables for NAND memory management, such as the track table 30, the cluster directory table 31, the cluster table 32, the cluster block information table 33, and the logical-to-physical translation table 40 shown in FIG. 7, among the above management tables are stored in a specific area of the nonvolatile NAND memory 10. At the time of start-up, each management table stored in the NAND memory 10 is loaded onto a work area of the volatile DRAM 20, which is used by the data managing unit 120, so that each management table is updated. Each management table loaded on the DRAM 20 is called a master table. Even when the power is turned off, the master table needs to be restored to a state before the power is turned off, so that a system of storing the master table in the nonvolatile NAND memory 10 is needed. A snapshot indicates a whole nonvolatile management table on the NAND memory 10. An operation of storing the master table loaded on the DRAM 20 directly in the NAND memory 10 is expressed also as "take a snapshot". A log indicates a change difference of a management table. If a snapshot is taken for every update of a master table, a processing speed becomes slow and the number of times of writing in the NAND memory 10 increases, so that only a log as a change difference is normally recorded in the NAND memory 10. An operation of reflecting a log in a master table and storing it in the NAND memory 10 is expressed also as "commit".

Figure 8:
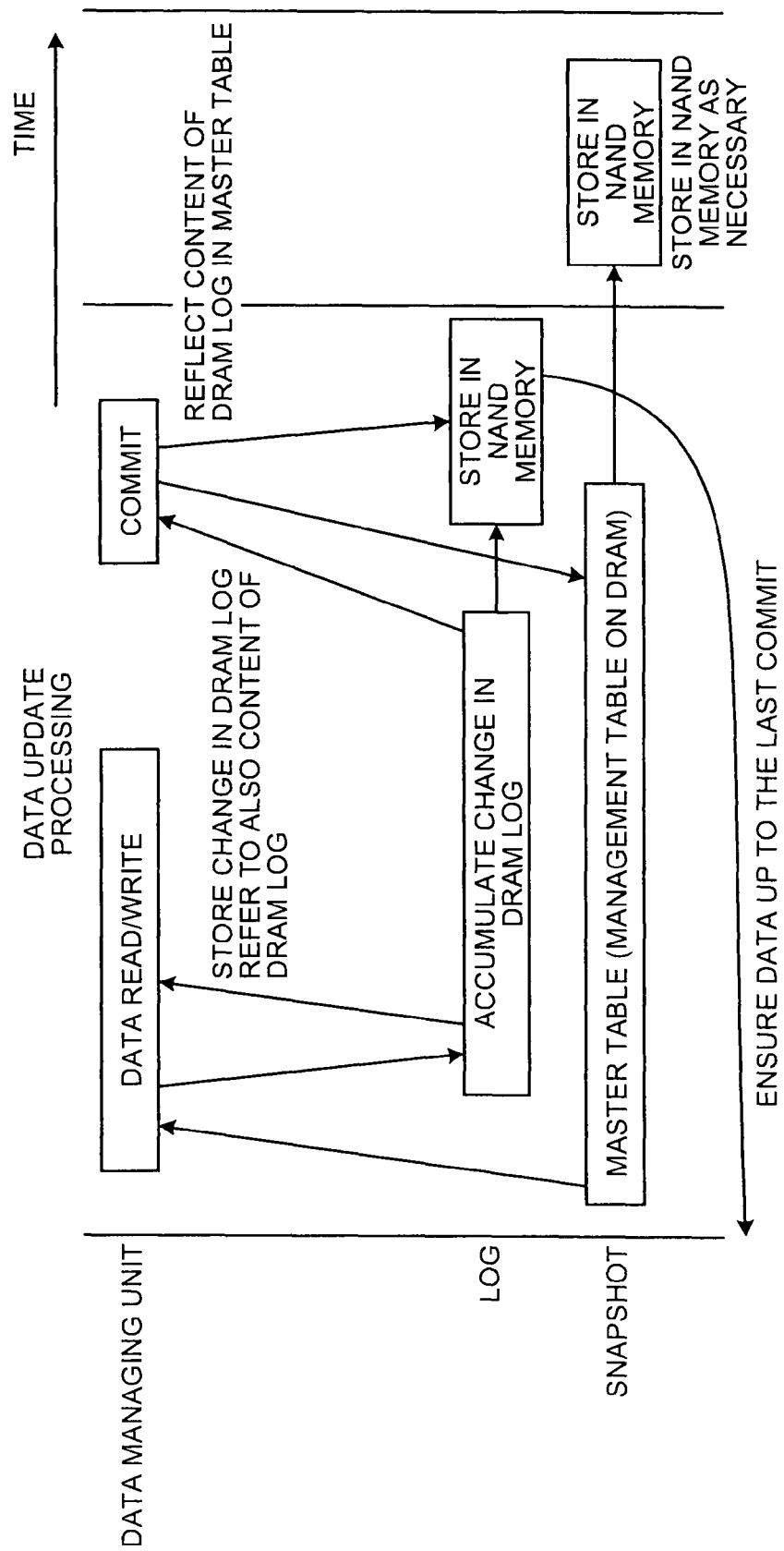
FIG. 8 is a schematic diagram of a generation state of a snapshot and a log.

FIG. 8 is a schematic diagram illustrating an updating state of a snapshot and a log at the time of data update. When the data managing unit 120 updates data, changes made to a master table are accumulated in a log (hereinafter, "DRAM log") on the DRAM 20. Depending on the type of a management table, a master table is directly updated and an updated content is accumulated in a DRAM log, or an updated content is recorded in a change area secured on the DRAM log without directly changing a master table. When performing data readout or data writing, the accumulated DRAM log is also referred to in addition to a master table.

After data update becomes stable, a log is committed. In the commit processing, a content of a DRAM log is reflected in a master table as necessary and is further stored in the NAND memory 10 to make it nonvolatile. A snapshot is stored in the NAND memory 10 on occasions such as in a normal power-off sequence and when a storage area for a log on the DRAM 20 becomes insufficient. At the time when writing of a log or a snapshot in the NAND memory 10 is finished, the processing of making the management table nonvolatile is completed. A technology for making the management information nonvolatile in this manner is disclosed, for example, in International Patent Application PCT/JP2009/052597 by the same applicant, and the whole content thereof is incorporated in the present application.

<Read Processing>

Read processing is briefly explained. When a Read command and LBA as a readout address are input from the ATA-command processing unit 121, the data managing unit 120 searches through the RC management table 23 and the WC track table 24 to check whether data corresponding to the LBA is present in the WC 21 or the RC 22. In the case of a cache hit, the data managing unit 120 reads out data of the WC 21 or the RC 22 corresponding to the LBA and sends the data to the ATA-command processing unit 121.

If there is no hit in the RC 22 or the WC 21, the data managing unit 120 searches in which part of the NAND memory 10 data as a search target is stored. If the data is stored on the MS 11, the data managing unit 120 traces the LBA→the track table 30→the logical-to-physical translation table 40 to obtain the data on the MS 11. On the other hands, if the data is stored on the FS 12 or the IS 13, the data managing unit 120 traces the LBA→the track table 30→the cluster directory table 31→the cluster table 32→the logical-to-physical translation table 40 to obtain the data on the FS 12 or the IS 13.

<Write Processing>

(Processing in the WC 21)

Next, write processing is briefly explained. When a Write command and LBA as a write address are input from the ATA-command processing unit 121, data specified by the LBA is written on the WC 21. If the WC 21 has no free area, data is flushed from the WC 21 to be written in the NAND memory 10 by referring to each management table for DRAM management thereby generating a free area. A low-density track in which the number of valid clusters in a track is less than a specific percentage is flushed to the FS 12 as cluster size data. When the flush destination is the FS 12, a valid cluster in the track is written in logical page units.

A high-density track in which the number of valid clusters in a track is equal to or more than the specific percentage is flushed to the MS 11 as track size data. When the flush destination is the MS 11, data of a track size is directly written in the whole logical block. When there is a plurality of logical blocks as a writing target, the transfer efficiency is improved by using the double-speed mode or the bank interleave. Each management table for DRAM management is updated in accordance with data written in the WC 21 or flush of data to the NAND memory 10.

(Writing in the MS 11)

Figure 9:
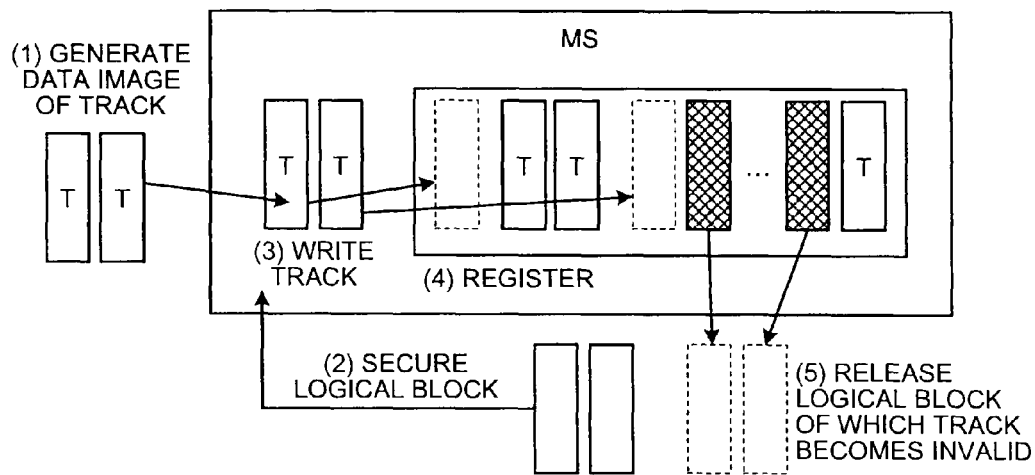
FIG. 9 is a schematic diagram illustrating write procedures in a main storage area (MS) shown in FIG. 5.

Writing in the MS 11 is performed in the following procedures as shown in FIG. 9.

1. A data image of a track is generated on the DRAM 20 (padding processing). Specifically, a cluster that is not present in the WC 21 and a cluster that holds not all the sectors in the WC 21 are read out from the NAND memory 10 to be integrated with data of the WC 21.

2. A logical block (track block) is secured from a CFB for the MS 11. The track block is a block that stores therein data in track units among logical blocks.

3. The generated data image of the track is written in the secured logical block.

4. Track information is checked from LBA of the track, which is correlated with a logical block address corresponding to the written logical block to be registered in a required table for NAND memory management.

5. Old data in the WC 21 and the NAND memory 10 is invalidated.

(Writing in the FS 12)

Figure 10:
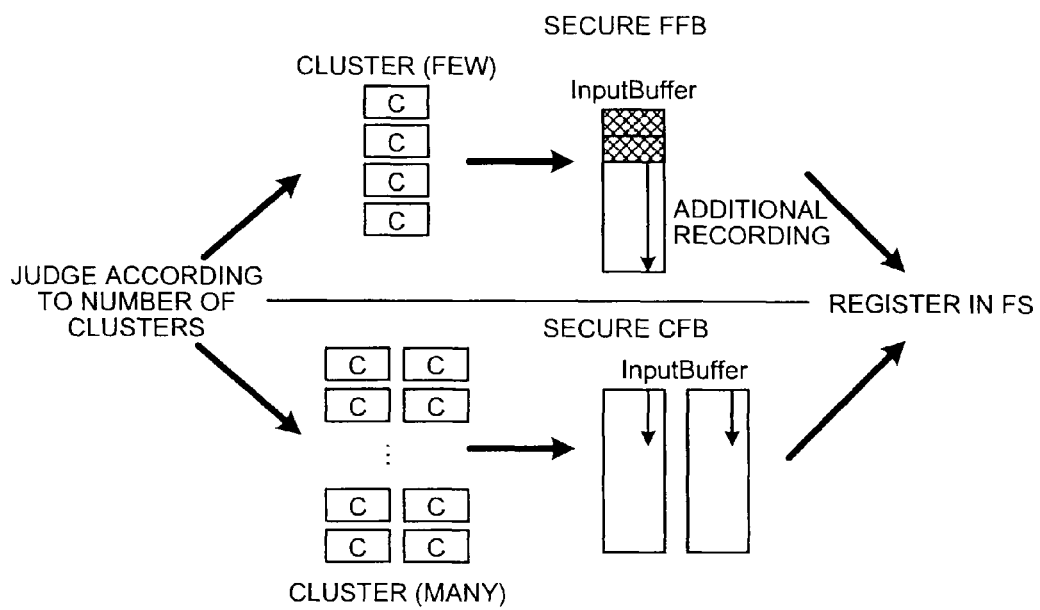
FIG. 10 is a schematic diagram illustrating writing in a pre-stage storage area (FS) shown in FIG. 5.

Writing in the FS 12 is performed by generating a data image of a cluster on the DRAM 20 (padding processing) and performing writing on a newly-secured logical block (cluster block) in logical page units by using the pseudo SLC mode. As the logical block to be secured, an FFB having a logical page capable of writing a data image equal to or more than a data image to be written is prioritized. If an FFB is not present, a CFB is used. The writing in the FS 12 is performed in the procedures as shown in FIG. 10.

A logical block (cluster block) for writing data of a low-density track from the WC 21 to the FS 12 is called an FS input buffer (FSIB).

1. When a total data amount in the low-density track input from the WC 21 is small, i.e., when the number of valid clusters is smaller than a specific threshold, an FFB in which the data can be written is secured to be an FSIB.

2. When the total data amount in the low-density track input from the WC 21 is large, i.e., when the number of valid clusters is equal to or larger than the specific threshold, a CFB is secured to be an FSIB. At this time, a plurality of logical blocks capable of writing data in parallel is secured to be an FSIB.

3. A data image of a cluster to be written is generated on the DRAM 20. Specifically, regarding a cluster that holds not all the sectors in the WC 21, data of a sector that is not present on the WC 21 is read out from the NAND memory 10 to be integrated with data of a sector on the WC 21.

4. The cluster on the WC 21 and the cluster image generated on the work area are written in the FSIB.

5. The FSIB is added to a list of the FS 12.

6. The written track is reinserted into the end of the cluster directory LRU table 31*a*.

(Movement from the FS 12 to the IS 13)

Figure 11:
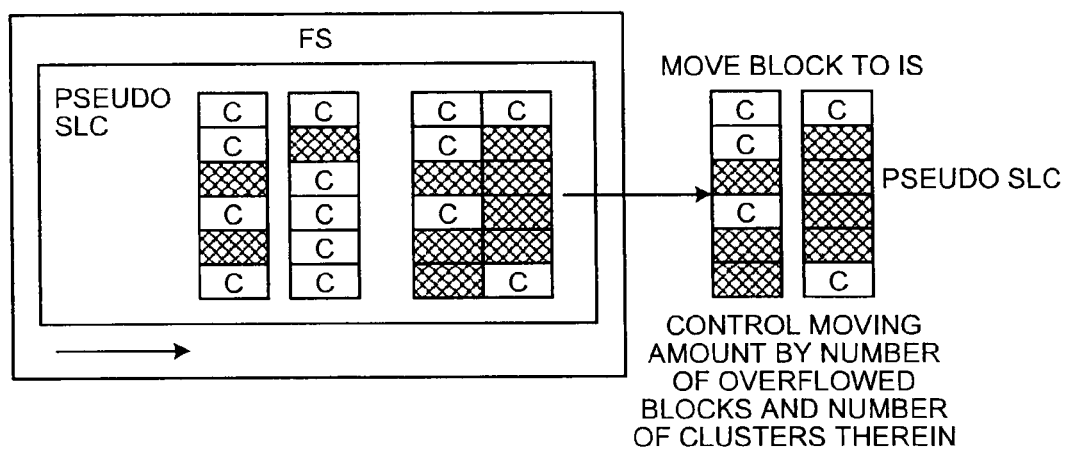
FIG. 11 is a schematic diagram illustrating a block movement from the FS to an intermediate stage storage area (IS) shown in FIG. 5.

When the number of logical blocks under the management of the FS 12 exceeds the maximum number of logical blocks, as shown in FIG. 11, a logical block that is overflowed from the FS 12 is moved directly to the IS 13. The number of logical blocks to be moved in one process is determined by the following rule in accordance with the number of valid clusters in the overflowed logical block.

A logical block that is moved is added from the oldest logical block of the FS 12 so that the number of clusters in the overflowed logical block becomes close to the border of one logical block of the MLC mode. The number of clusters is caused to be close to the border of one logical block of the MLC mode to accommodate valid clusters as many as possible in a logical block after the compaction.

When the number of clusters exceeds the number of clusters that can be subjected to the compaction simultaneously in the IS 13, the number of blocks is set so that the number of clusters is equal to or smaller than the number of clusters that can be subjected to the compaction simultaneously in the IS 13.

The upper limit value is set to the number of blocks to be moved.

(Compaction and Defragmentation in the IS 13)

In the IS 13, when the number of logical blocks under the management of the IS 13 exceeds the maximum number of logical blocks, the IS 13 suppresses the number of logical blocks to be equal to or less than the maximum number of blocks by data movement (defragmentation processing) to the MS 11 and the compaction. When a data erasing unit (logical block) and a data management unit (cluster) are different, according to the progress of rewriting of the NAND memory 10, logical blocks are made porous by invalid data. When the logical blocks in such a porous state increase, substantially usable logical blocks decrease and a storage area of the NAND memory 10 cannot be effectively used. Therefore, processing called compaction for collecting valid clusters and rewriting it in a different logical block is performed. The defragmentation processing is processing of integrating clusters of the FS 12 and the IS 13 into a track and flushing it to the MS 11.

Subsequently, the essential part of this embodiment is explained more in detail. First, the forward lookup address translation using the forward lookup management table and the reverse lookup address translation using the reverse lookup management table are explained.

(Forward Lookup Address Translation)

Figure 12:
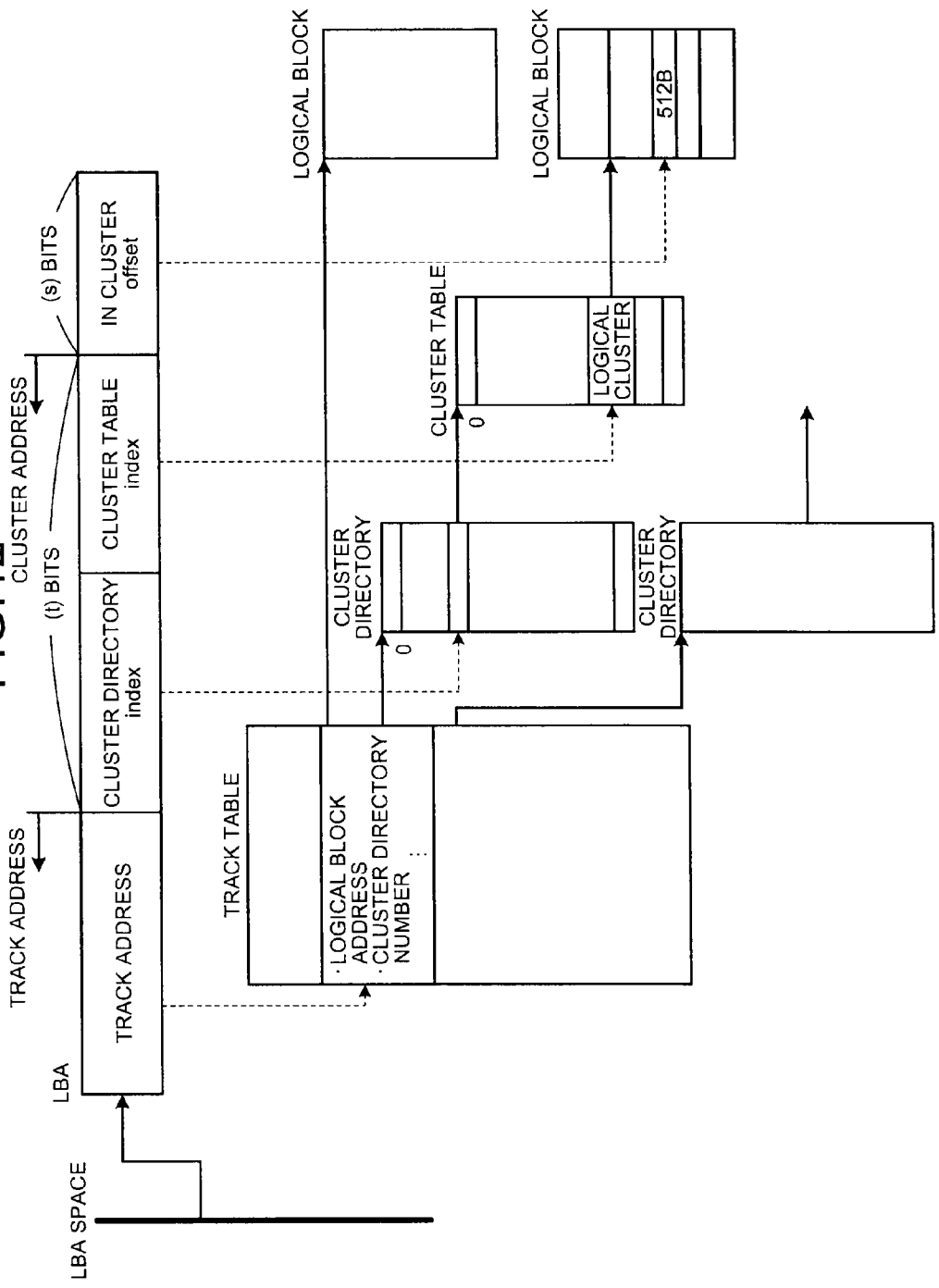
FIG. 12 is a schematic diagram illustrating a forward lookup address translation.

FIG. 12 is a schematic diagram illustrating the forward lookup address translation. The forward lookup address translation is to obtain a logical cluster address (logical block address and offset) in which data is actually recorded from LBA. The forward lookup address translation is mainly performed to read out data from the NAND memory 10 to the DRAM 20, more specifically, to read out data required from the ATA-command processing unit 121 and to read out padding data when writing data in the NAND memory 10 and organizing data in the NAND memory 10. In the forward lookup address translation, a logical NAND address is obtained by tracing tables of two stages from the track table 30, i.e., the LBA→the track table 30→the cluster directory table 31→the cluster table 32→the logical NAND address.

Figure 13:
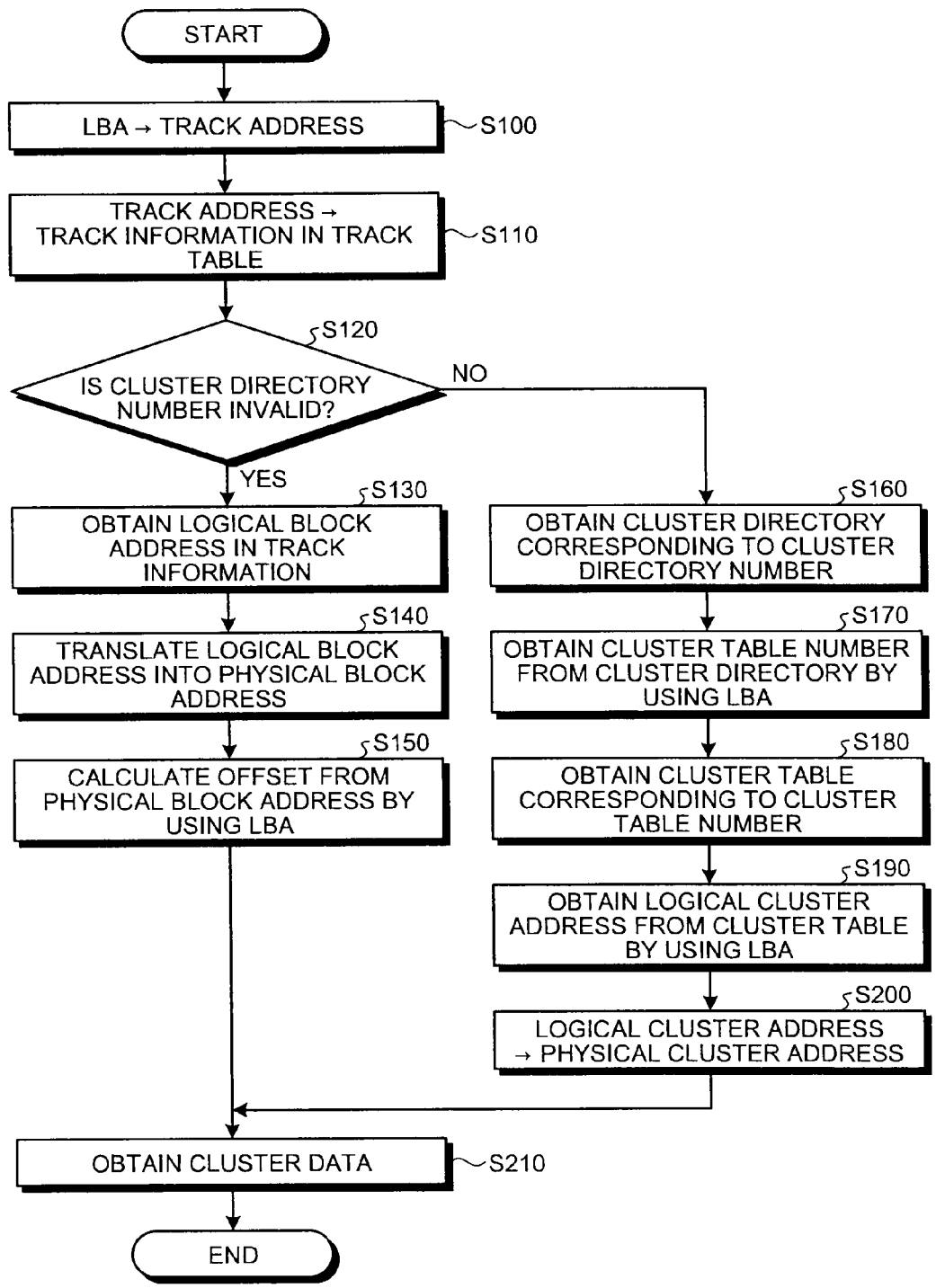
FIG. 13 is a flowchart of an operation of the forward lookup address translation.

FIG. 13 is a flowchart of the forward lookup address translation processing performed by the data managing unit 120.

Specifically, the data managing unit 120 translates LBA into a track address higher in order than a (s+t+1)th bit (Step S100), obtains track information from the track table 30 with the translated track address as an index (Step S110), and obtains a cluster directory number in the track information. The data managing unit 120 determines whether the cluster directory number is an invalid value or a valid value (Step S120). If the cluster directory number is an invalid value (Yes at Step S120), it is determined that data is stored in the MS 11 and a logical block address is obtained from the track information (Step S130). The data managing unit 120 translates the obtained logical block address into a physical block address by the logical-to-physical translation table 40 (Step S140), and further calculates offset from the calculated physical block address from LSB (t) bits of a cluster address of the LBA (Step S150), thereby obtaining cluster data in the physical block (Step S210).

On the other hands, if the cluster directory number is a valid value (No at Step S120), the data managing unit 120 obtains a cluster directory corresponding to the cluster directory number (Step S160), obtains an identifier (cluster table number) of a cluster table from the cluster directory with upper few bits of LSB (t) bits of the cluster address as an index (cluster directory index) with respect to the obtained cluster directory (Step S170), and obtains the cluster table corresponding to the identifier (Step S180). The data managing unit 120 obtains a logical cluster address (logical block address and offset) from the cluster table with lower few hits of the LSB (t) bits of the cluster address of the LBA as an index (cluster table index) (Step S190). The data managing unit 120 translates the obtained logical block address into a physical block address by the logical-to-physical translation table 40 (Step S200) and obtains cluster data (Step S210).

(Reverse Lookup Address Translation)

Figure 14:
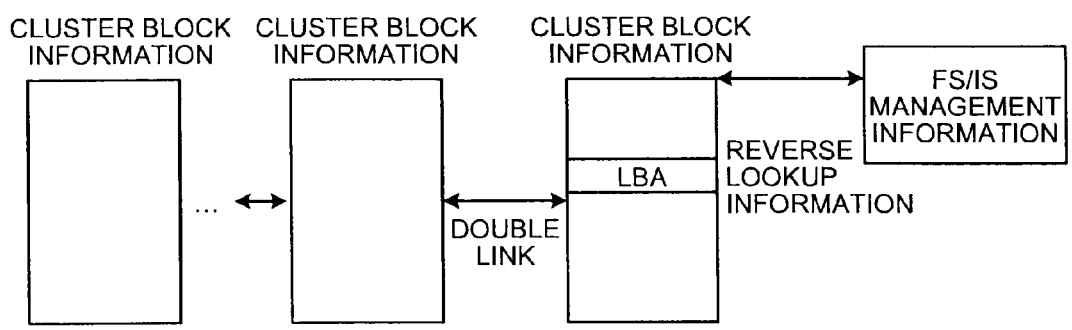
FIG. 14 is a schematic diagram illustrating a reverse lookup address translation.
Figure 15:
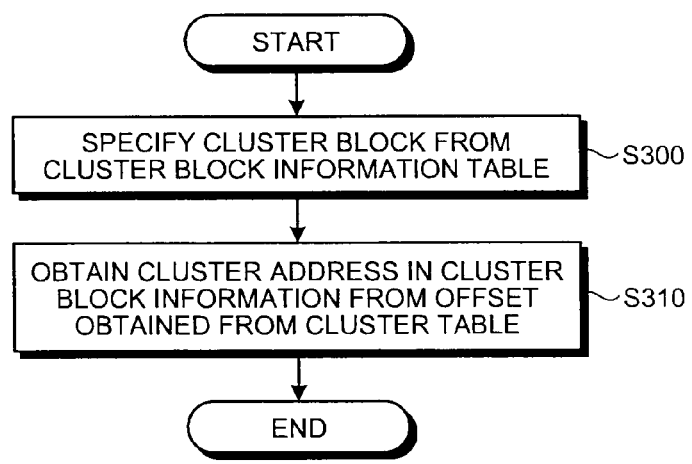
FIG. 15 is a flowchart of an operation of the reverse lookup address translation.

FIG. 14 is a schematic diagram illustrating the reverse lookup address translation. FIG. 15 is a flowchart of the reverse lookup address translation processing performed by the data managing unit 120. The reverse lookup address translation is to obtain LBA of data from a logical cluster address (logical block address and offset) in which the data is actually recorded. The reverse lookup address translation is mainly performed for the compaction of the IS 13. Data (track or cluster) of the LBA stored in a logical block as a compaction target is checked to be used for rewriting the data to a different logical block. When writing data in the NAND memory 10 or organizing data in the NAND memory 10, reverse lookup management information is updated.

In the present embodiment, the reverse lookup address translation is used only with respect to data in the FS 12 and the IS 13 in which data is recorded in cluster units, and is not used for data in the MS 11 that records data in track units. Reverse lookup information of data in cluster units is stored in the cluster block information table 33. In performing the reverse lookup address translation, first, the data managing unit 120 specifies a certain cluster block. The following procedures are performed to determine LBA of a cluster stored in the specified cluster block by the data managing unit 120. The reverse lookup address translation for a cluster block belonging to the IS 13 is explained.

1. The data managing unit 120 searches a list of the cluster block information table 33 belonging to the IS 13. In the compaction of the TS 13, a cluster block is selected from among cluster blocks belonging to the IS 13 in accordance with a certain rule (Step S300). The cluster blocks belonging to the IS 13 are managed in a double link structure in the cluster block information table 33, so that it is possible to reach the cluster block information by tracing the link.

2. As described above, the cluster table 32 also has an array of cluster block information numbers and information (offset) about cluster positions therein. The data managing unit 120 obtains a cluster address in the cluster block information with information (offset) about a cluster position obtained from the cluster table 32 as an index (Step S310).

The track table 30, the cluster directory table 31, and the cluster table 32, for the forward lookup, and the cluster block information table 33 for the reverse lookup basically share information. If a failure occurs in one of the forward lookup management table and the reverse lookup management table, the reverse lookup management table can be restored from the forward lookup management table, or vice versa. In the present embodiment, a reverse lookup address translation table in track units for the MS 11 is not provided, and LBA is obtained by scanning the track table 30 that manages tack information as the forward lookup information.

Figure 16:
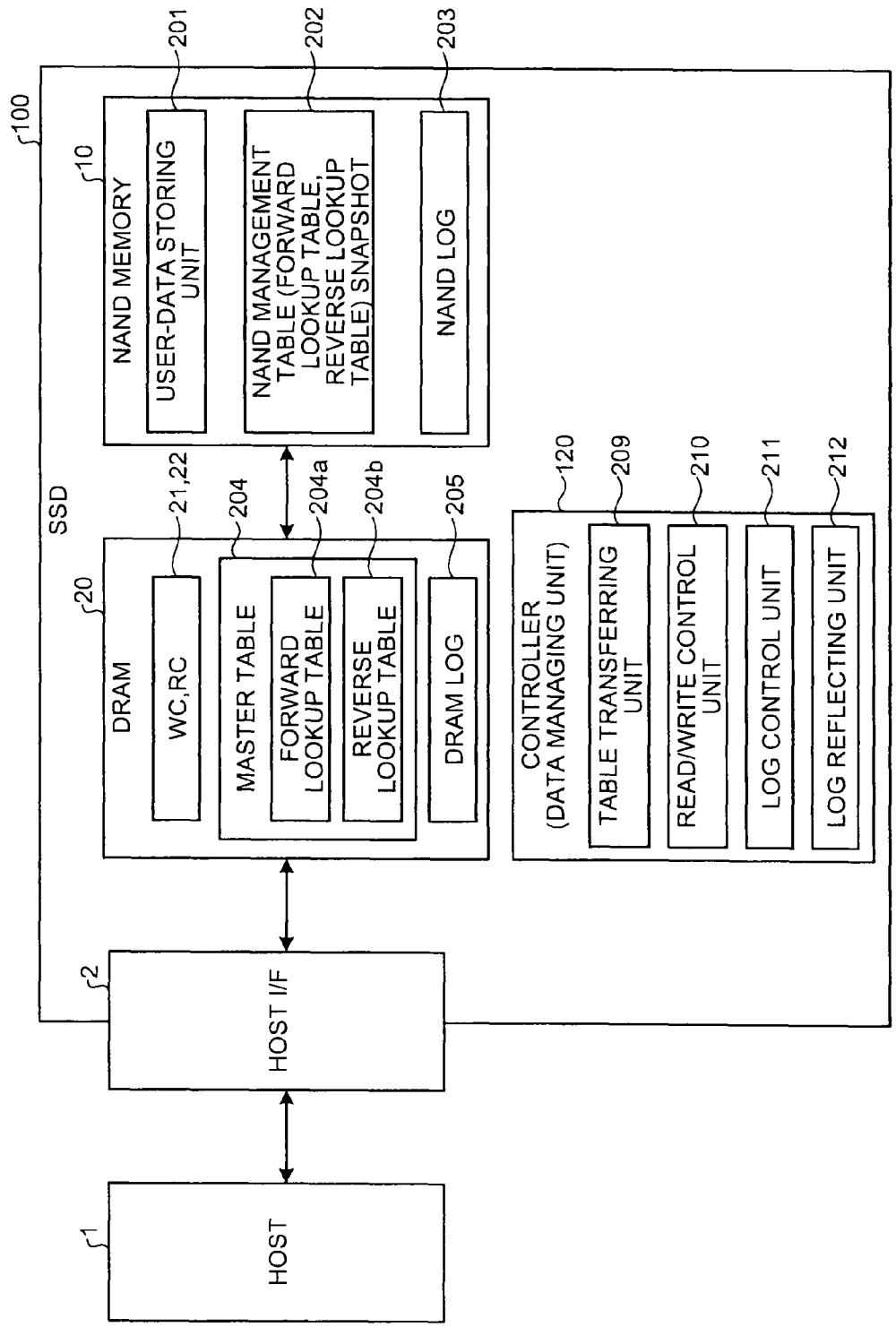
FIG. 16 is a functional block diagram illustrating a relevant portion according to the present embodiment of the present invention.

FIG. 16 is a functional block diagram illustrating a relevant portion according to the present embodiment of the present invention. As described above, the NAND memory 10 stores a user-data storing unit 201, such as the MS 11, the FS 12, and the IS 13, which stores therein user data, a NAND management table 202 for NAND memory management that is stored in a specific storage area on the NAND memory 10 as a snapshot, and a log (hereinafter, "NAND log") 203 that is stored in a specific storage area on the NAND memory 10 in the similar manner to the NAND management table 202 as change difference information of the NAND management table 202. The NAND management table 202 includes tables shown in FIG. 7, such as the track table 30, the cluster directory table 31, the cluster table 32, the cluster block information table 33, and the logical-to-physical translation table 40, except for tables for DRAM management.

In the DRAM 20, the WC 21, the RC 22, a master table 204 that is the NAND management table 202 loaded on the DRAM 20, and a DRAM log 205 as a log on the DRAM 20 that accumulates and stores changes made to the master table 204 are stored. As described above, the master table 204 includes a forward lookup table 204a for performing the forward lookup address translation and a reverse lookup table 204b for performing the reverse lookup address translation.

A controller 120 as the data managing unit includes a table transferring unit 209, a read/write control unit 210, a log control unit 211, and a log reflecting unit 212.

The table transferring unit 209 performs various processing, such as processing of transferring various NAND management tables (snapshot) 202 stored in the NAND memory 10 to the DRAM 20 as the master table 204 at the time of start-up and processing of storing the master table 204 on the DRAM 20 in the NAND memory 10 as a snapshot when a specific condition is satisfied such as when a normal power-off sequence occurs or a storage area for a log becomes insufficient.

The read/write control unit 210 performs the above-described read/write control based on the master table 204 and the DRAM log 205.

The log control unit 211 performs processing of accumulating and storing only difference information of the reverse lookup table 204b of the master table 204, which manages the reverse lookup information, before and after update when an event occurs so that the master table 204 needs to be updated.

When a specific condition is satisfied, such as when an amount of log reaches a certain value or at the time when data update becomes stable so that management tables are consistent with each other after accumulated log is reflected in each management table of the master table 204, the log reflecting unit 212 stores the DRAM log 205 on the DRAM 20 in the NAND memory 10 as the NAND log 203 and performs the commit processing of reflecting the DRAM log 205 in both of the forward lookup table 204a and the reverse lookup table 204b. After a snapshot is taken or the commit processing is performed, the DRAM log 205 accumulated on the DRAM 20 is invalidated.

Figure 17:
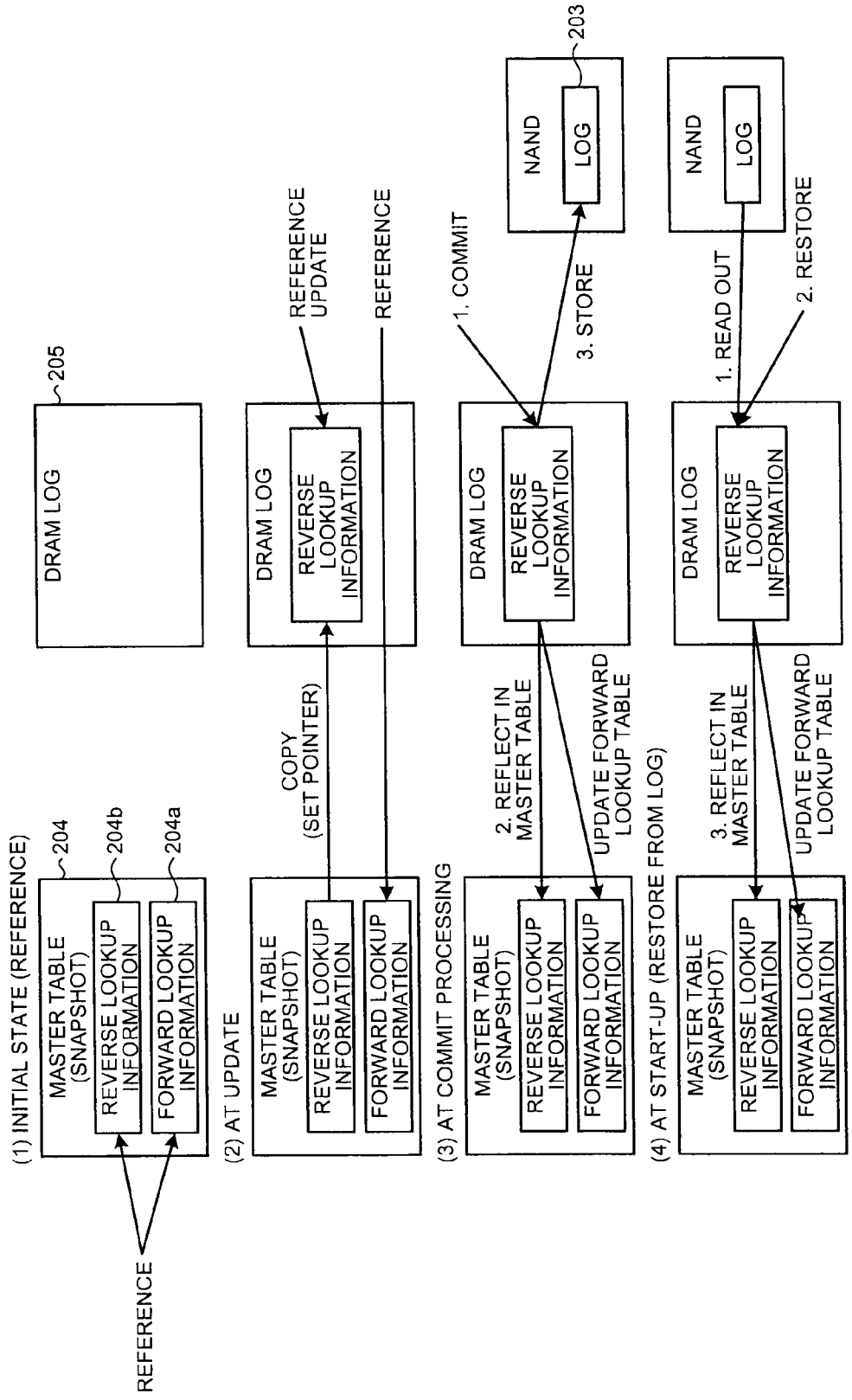
Figure 18:
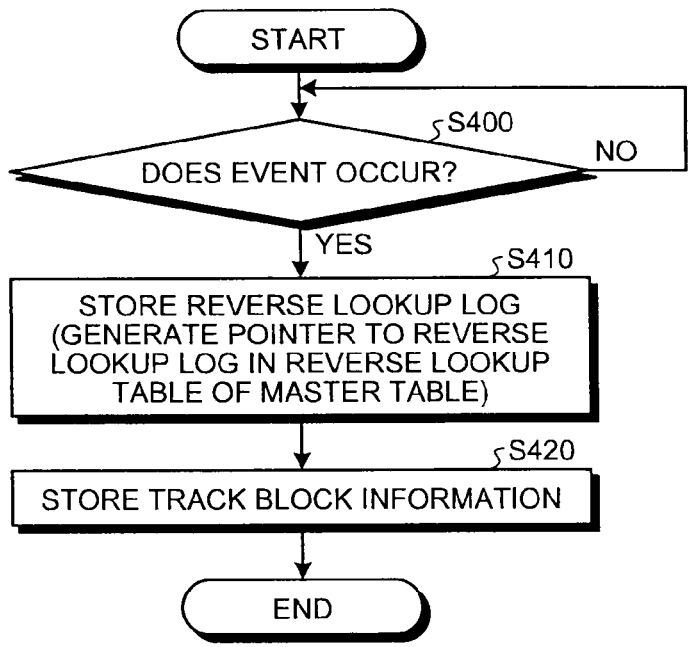
FIG. 18 is a flowchart of accumulation processing of log.
Figure 19:
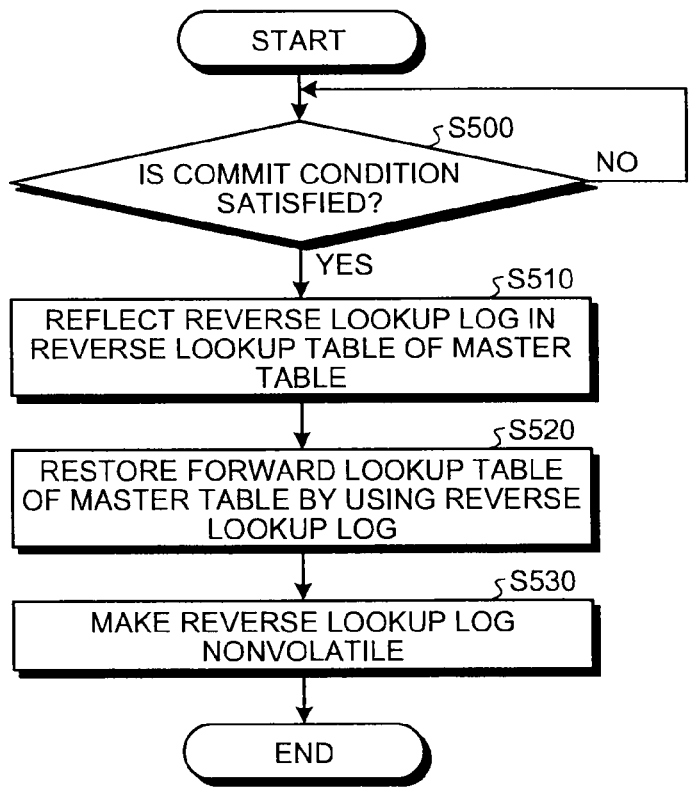
FIG. 19 is a flowchart of the commit processing of log.
Figure 20:
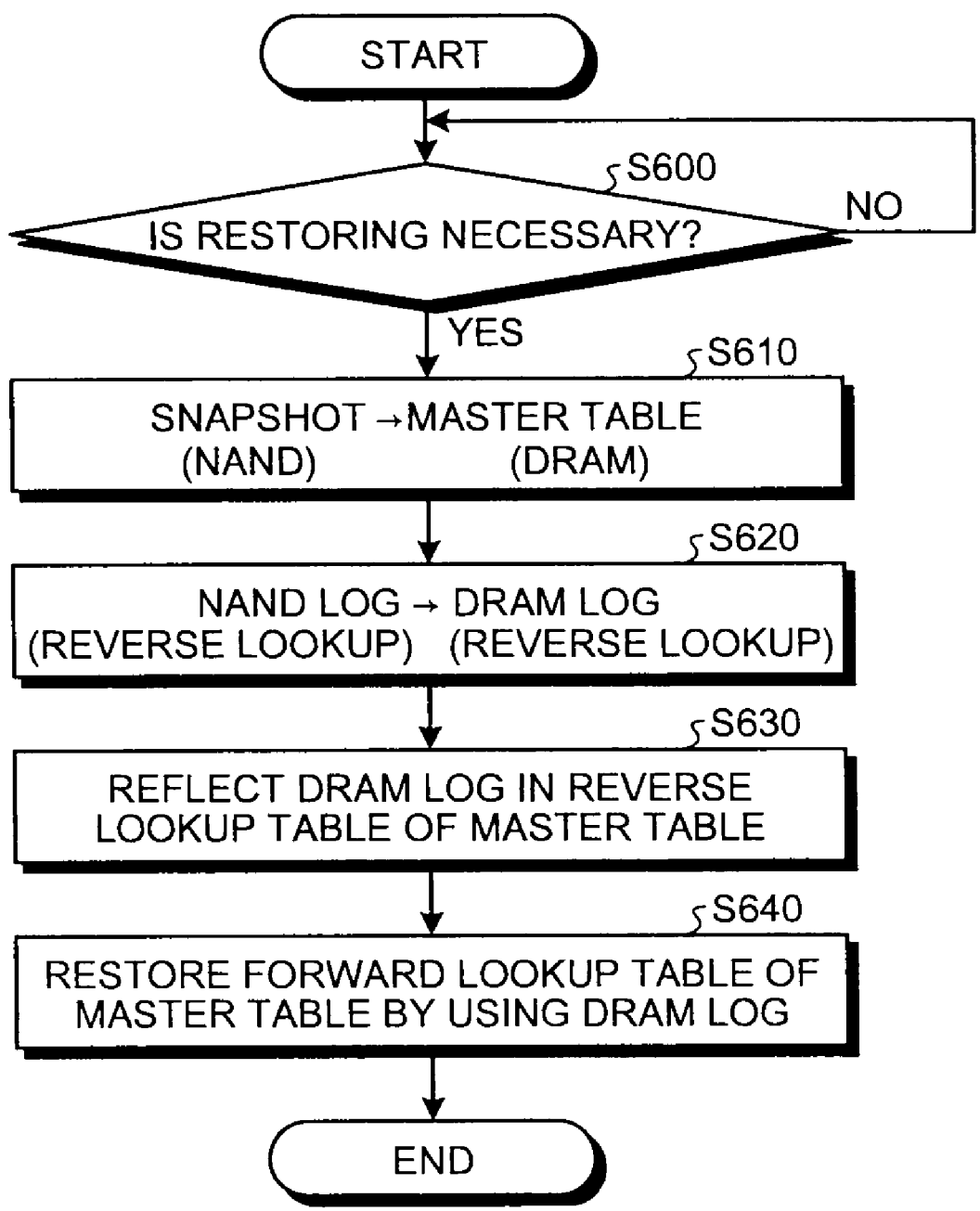
FIG. 20 is a flowchart of table restoring processing.

Next, accumulation of log, the commit processing, a restoring operation, and the like are explained with reference to FIGS. 17 to 20. FIG. 17 is a schematic diagram for explaining the accumulation of log, the commit processing, the restoring operation, and the like. FIG. 18 is a flowchart of the log accumulation processing. FIG. 19 is a flowchart of the commit processing of log. FIG. 20 is a flowchart of the table restoring processing.

In an initial state, the read/write control unit 210 performs the above-described read/write control based on only the master table 204 that the table transferring unit 209 transfers on the DRAM 20. When an event occurs so that the master table 204 needs to be updated, such as writing on the NAND memory 10 or organizing data in the NAND memory 10 (defragmentation or compaction) (Step S400), the log control unit 211 secures a copy of only a changed portion of the master table 204 to the DRAM log 205 without directly updating the master table 204 and records a change difference to the copy for update.

When generating the DRAM log 205, the log control unit 211 updates only the reverse lookup table 204b that manages the reverse lookup information, and does not update the forward lookup table 204a that manages the forward lookup information, which is only referred to (Step S410). The cluster block information table 33 belongs to a reverse lookup table among the NAND management tables shown in FIG. 7. The cluster block information is information indicating a cluster address (LBA) of data stored in a logical block belonging to the FS 12 and the IS 13, and each cluster block information, for example, is managed by dividing a logical block in a certain size (cluster page) such as in logical page units for reducing a recording size to a log. Therefore, one to a plurality of updates that occurs in a cluster page that is divided in a certain size is accumulated and recorded in order in the same entry of the DRAM log 205.

As described above, although a reverse lookup address translation table for the MS 11 (logical table→LBA track address) in track units is not provided, because only a log of a reverse lookup table is taken in the present embodiment, the log control unit 211 records a log of temporary reverse lookup information of a track called track block information in the DRAM log 205 for updating the track table 30 (Step S420). In the track block information, a logical block address in which a track is written and a track address are stored.

When an entry of the same management table is referred to or updated many times, the read/write control unit 210 and the log control unit 211 take a copy on the DRAM log 205 as a target for reference or update as the latest management information. As a method of searching for a copy on the DRAM log 205, a pointer to the copy on the DRAM log 205 is embedded in the master table 204 (Step S410). For the reference or the update, an address of the copy is brought to be a target for the reference or the update. Consequently, when the read/write control unit 210 refers to a table, whether the table is the master table 204 or the copy on the DRAM log 205 can be transparently handled.

Next, when a specific condition (first condition) is satisfied, such as when an amount of log reaches a certain value or when updated management tables are consistent with each other (Step S500), the commit processing is performed. In the commit processing, the log reflecting unit 212 reflects the DRAM log 205 that accumulates only the reverse lookup information in the reverse lookup table 204b (Step S510), restores the forward lookup table 204a by using the DRAM log 205 that accumulates only the reverse lookup information (Step S520), and further stores the DRAM log 205 that accumulates only the reverse lookup information in the NAND memory 10 as the NAND log 203 to make it nonvolatile (Step S530). In the commit processing, when the DRAM log 205 is reflected in the master table 204, interrupt read from the host is prohibited.

When the cluster block information as the reverse lookup information is committed, the following processing is performed for each cluster block information.

(1) The log reflecting unit 212 compares cluster addresses in a logical block of the master table 204 that correspond to cluster block information on the DRAM log 205, and reflects a cluster address that becomes a valid state from an invalid state in the forward lookup address translation table such as the track table 30, the cluster directory table 31, and the cluster table 32.

If the cluster directory table 31 and the cluster table 32 are not allocated to track information, an entry is secured.

A logical block address and a cluster position corresponding to the cluster block information are set to the cluster table 32.

(2) The log reflecting unit 212 copies the cluster block information on the DRAM log 205 to the corresponding master table 204.

When track block information as the reverse lookup information is committed, the following processing is performed for each track block information.

(1) The log reflecting unit 212 releases the cluster directory table 31 and the cluster table 32 in track information corresponding to a track address in track block information on the DRAM log 205.

(2) The log reflecting unit 212 sets a logical block address in the track block information to corresponding track information.

The forward lookup management table is updated to the latest state by the commit processing. That is, the read/write control unit 210 can perform the above-described read/write control by referring to the latest forward lookup management table after the commit processing.

When a specific condition (second condition) is satisfied, such as when a normal power-off sequence occurs or when a storage area for a log becomes insufficient, the table transferring unit 209 stores the master table 204 on the DRAM 20 as a snapshot in the NAND memory 10 as the NAND management table 202.

When, for example, incorrect power-off occurs without a normal power-off sequence being performed, the NAND management table 202 in the NAND memory 10 is not the latest condition and the NAND log 203 is the latest condition.

For example, when the log reflecting unit 212 detects such condition by comparing timestamps of the NAND log 203 and the NAND management table 202 at the time of start-up of the SSD 100 (Step S600), the table transferring unit 209 transfers the NAND management table (snapshot) 202 stored in the NAND memory 10 to the DRAM 20 as the master table 204 (Step S610). Furthermore, the log control unit 211 transfers the NAND log (only the reverse lookup information) 203 to the DRAM 20 to generate the DRAM log 205 (only the reverse lookup information) (Step S620). Thereafter, the log reflecting unit 212 reflects the generated DRAM log 205 in the reverse lookup table 204b (Step S630) and restores the forward lookup table 204a by using the DRAM log 205 (Step S640).

The forward lookup information is not included in a log, so that the log can be reduced. Moreover, if a forward lookup master table is not updated in an update operation in which the status of the master table and the log is unstable, the forward lookup master table is always in a stable condition except when the DRAM log 205 is reflected in the forward lookup master table, so that the forward lookup address translation can be performed always by the master table in response to interrupt read from a host.

In the write processing of data on the FS 12 or the IS 13, while considering logical block units, a free page of a block is searched for, and data is additionally written in the free page. A reverse lookup table indicates the type of data held in a free area of a block or in a block, and write processing mainly uses the reverse lookup table. In such write processing, the forward lookup table is used only for padding, invalidation of overwritten data, and the like. Therefore, designing becomes easy and the cost for designing can be reduced by storing reverse lookup information as a log rather than forward lookup information.

According to the first embodiment, only changes of a reverse lookup table are recorded in a log, and a forward lookup table is constructed based on the log of the reverse lookup table at the time of the commit processing, so that the amount of the log that needs to be stored in a DRAM or a NAND memory can be reduced.

In the present embodiment, only reverse lookup information is recorded as a log; however, it is possible to reduce a log by recording only forward lookup information. Moreover, a reverse lookup address translation table in track units for the MS 11 is not provided and only a reverse lookup address translation table in cluster units for the FS 12 and the IS 13 is provided; however, when the compaction processing is needed also in the MS 11 because a track size is set to be smaller than a logical block size, a reverse lookup address translation table in track units can be provided to speed up the searching processing.

(Second Embodiment)

Figure 21:
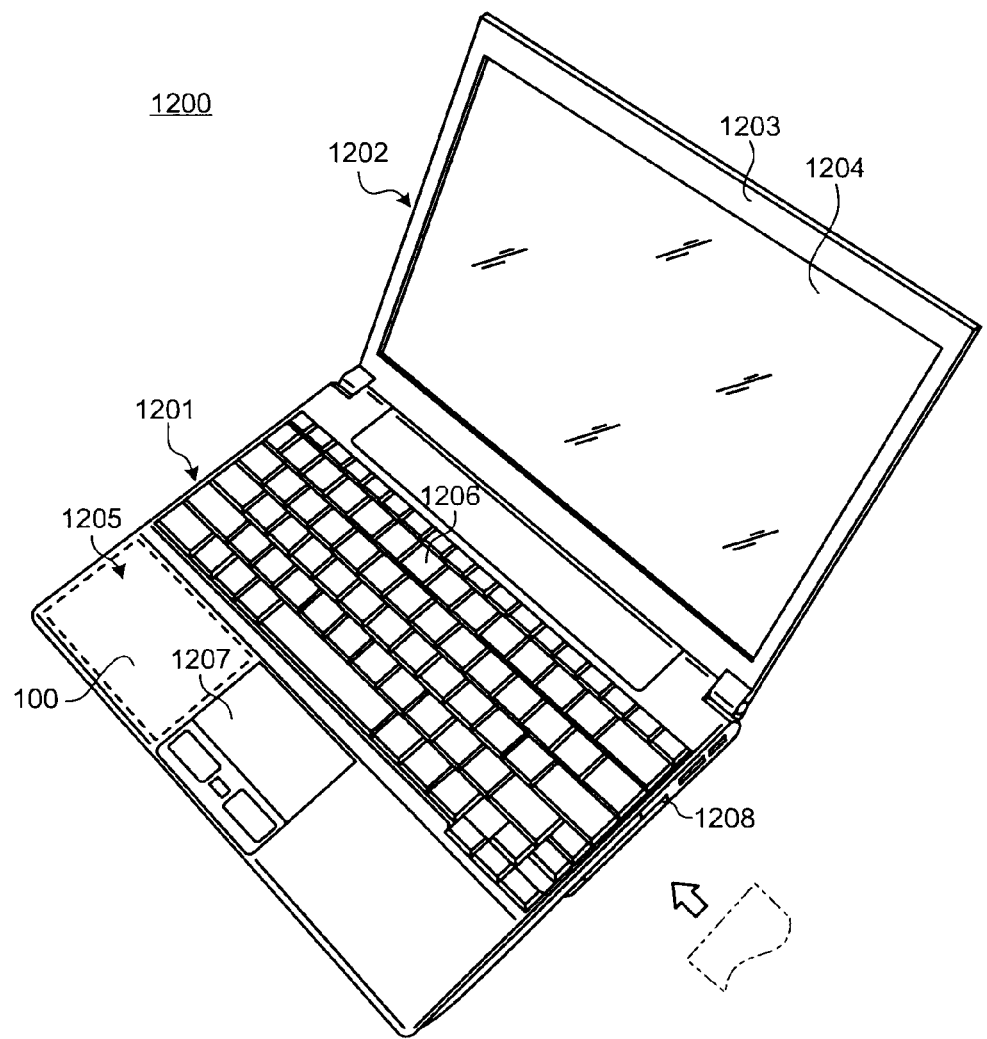
FIG. 21 is a perspective view of a PC on which the SSD is mounted.

FIG. 21 is a perspective view of an example of a PC 1200 on which the SSD 100 is mounted. The PC 1200 includes a main body 1201 and a display unit 1202. The display unit 1202 includes a display housing 1203 and a display device 1204 accommodated in the display housing 1203.

The main body 1201 includes a chassis 1205, a keyboard 1206, and a touch pad 1207 as a pointing device. The chassis 1205 includes a main circuit board, an optical disk device (ODD) unit, a card slot, and the SSD 100.

The card slot is provided so as to be adjacent to the peripheral wall of the chassis 1205. The peripheral wall has an opening 1208 facing the card slot. A user can insert and remove an additional device into and from the card slot from outside the chassis 1205 through the opening 1208.

The SSD 100 can be used instead of a conventional hard disk drive (HDD) in the state of being mounted on the PC 1200 or can be used as an additional device in the state of being inserted into the card slot.

FIG. 22 is a schematic diagram of a system configuration example of the PC 1200 on which the SSD 100 is mounted. The PC 1200 includes a CPU 1301, a north bridge 1302, a main memory 1303, a video controller 1304, an audio controller 1305, a south bridge 1309, a basic input/output system read-only memory (BIOS-ROM) 1310, the SSD 100, an ODD unit 1311, an embedded controller/keyboard controller IC (EC/KBC) 1312, and a network controller 1313.

The CPU 1301 is a processor for controlling an operation of the PC 1200, and executes an operating system (OS) loaded from the SSD 100 onto the main memory 1303. Furthermore, when the ODD unit 1311 is capable of executing at least one of read processing and write processing on a mounted optical disk, the CPU 1301 executes the processing.

Moreover, the CPU 1301 executes a system BIOS stored in the BIOS-ROM 1310. The system BIOS is a computer program for controlling a hardware of the PC 1200.

The north bridge 1302 is a bridge device that connects a local bus of the CPU 1301 to the south bridge 1309. The north bridge 1302 has a memory controller for controlling an access to the main memory 1303.

Moreover, the north bridge 1302 has a function of executing a communication with the video controller 1304 and a communication with the audio controller 1305 through an accelerated graphics port (AGP) bus and the like.

The main memory 1303 temporarily stores therein a computer program and data, and functions as a work area of the CPU 1301. The main memory 1303, for example, consists of a DRAM.

The video controller 1304 is a video reproduction controller for controlling the display unit 1202 used as a display monitor of the PC 1200.

The audio controller 1305 is an audio reproduction controller for controlling a speaker 1306 of the PC 1200.

The south bridge 1309 controls each device on a low pin count (LPC) bus 1314 and each device on a peripheral component interconnect (PCI) bus 1315. Moreover, the south bridge 1309 controls the SSD 100 that is a memory device storing various types of software and data through the ATA interface.

The PC 1200 accesses the SSD 100 in sector units. A write command, a read command, a flush command, and the like are input to the SSD 100 through the ATA interface.

The south bridge 1309 has a function of controlling an access to the BIOS-ROM 1310 and the ODD unit 1311.

The EC/KBC 1312 is a one-chip microcomputer in which an embedded controller for power management and a keyboard controller for controlling the keyboard 1206 and the touch pad 1207 are integrated.

The EC/KBC 1312 has a function of turning on/off the PC 1200 based on an operation of a power button by a user. The network controller 1313 is, for example, a communication device that executes communication with an external network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system managing address translation table, the memory system comprising:
 a volatile first storing unit;
 a nonvolatile second storing unit; and
 a controller configured to perform data transfer between a host apparatus and the second storing unit, wherein
 the first storing unit is capable of storing a master table that includes:
  a first address translation table for managing forward lookup information that correlates a logical address specified from the host apparatus with a storing position in the second storing unit, and
  a second address translation table for managing reverse lookup information that correlates the storing position in the second storing unit with the logical address specified from the host apparatus, and
 the controller includes
  a log control unit configured to, when an event occurs so that the master table needs to be updated, store difference information before and after update of any one of the first address translation table and the second address translation table as a log in the first storing unit,
  a log reflecting unit configured to, when a first condition is satisfied, store the log stored in the first storing unit in the second storing unit and incorporate the log stored in the first storing unit into the master table to update both of the first address translation table and the second address translation table, and
  a read and write control unit configured to control the data transfer by using the log stored in the first storing unit and the master table.

2. The memory system according to claim 1, wherein the first condition includes at least one of a case in which an amount of the log reaches a specific threshold and a case when update of data becomes stable.

3. The memory system according to claim 1, wherein a pointer that indicates a storing position in the first storing unit at which the corresponding log is stored is registered in any one of the first address translation table and the second address translation table.

4. The memory system according to claim 1, wherein the log reflecting unit prohibits an interrupt read from the host apparatus while storing the log stored in the first storing unit in the second storing unit and incorporating the log stored in the first storing unit into the master table.

5. The memory system according to claim 1, wherein
the controller includes a table transferring unit configured to, when a second condition is satisfied, store the master table in the second storing unit as a snapshot and at a time of start-up of the memory system, transfer the snapshot stored in the second storing unit to the first storing unit, and
the log reflecting unit, when detecting that the log stored in the second storing unit is new compared with the snapshot, restores the master table by using the log stored in the second storing unit at a time of start-up of the memory system.

6. The memory system according to claim 5, wherein the second condition includes at least one of a case in which a normal power-off sequence occurs and a case in which a storage area for the log becomes insufficient on the first storing unit.

7. The memory system according to claim 1, wherein the log stored in the first storing unit by the log control unit is difference information before and after update of reverse lookup information managed by the second address translation table.

8. The memory system according to claim 5, wherein the log stored in the first storing unit by the log control unit is difference information before and after update of reverse lookup information managed by the second address translation table.

9. The memory system according to claim 1, wherein
the first storing unit further includes
a write cache area for temporarily storing write data to be written in the second storing unit, and
a read cache area for temporarily storing read data to be read from the second storing unit, and
the second storing unit performs data reading and writing by a page unit and performs erasing by a block unit that is a size twice or larger natural number times as large as the page unit.

10. The memory system according to claim 9, wherein
the controller allocates a storage area of the second storing unit to a first management storage area, a second management storage area, and a third management storage area by a logical block unit associated with one or more blocks, and
the controller executes:
first processing for flushing a plurality of data in sector unit written in the write cache area to the first management storage area as data in first management unit;
second processing for flushing the plurality of data written in the write cache area to the second management storage area as data in second management unit that is twice or a larger natural number times as large as the first management unit;
third processing for relocating an oldest logical block registered in the first management storage area to the third management storage area when a number of logical blocks in the first management storage area exceeds a tolerance;
fourth processing for selecting a plurality of valid data in first management units and rewriting selected valid data in a new logical block when a number of logical block in the third management storage area exceeds a tolerance;
fifth processing for integrating a plurality of data in first management units into data in second management units and flushing the data in second management units to the second management storage area, when a number of logical block in the third management storage area exceeds a tolerance; and
sixth processing for reading out a plurality of pieces of data stored in any one of the first management storage area, the second management storage area, and the third management storage area to the read cache area.

11. The memory system according to claim 10, wherein the controller, when flushing data written in the write cache area to the second storing unit, executes the first processing for data in second management units that includes valid data in first management units less than a specific ratio, and executes the second processing for data in second management units that includes valid data in first management units more than the specific ratio.

12. The memory system according to claim 10, wherein
the first address translation table includes a forward lookup table for searching for first information that indicates a storing position in the second management storage area of the data in second management units corresponding to a logical address in second management units and second information that indicates a storing position in any one of the first management storage area and the third management storage area of data in first management units included in the logical address in second management units, from the logical address in second management units,
the second address translation table includes a reverse lookup table for searching for an address in first management units corresponding to data in first management units included in a logical block corresponding to a logical block address, from the logical block address belonging to any one of the first management storage area and the third management storage area, and
the log control unit, when an event occurs so that the master table needs to be updated, stores difference information before and after update of the second address translation table stored in the first storing unit, in the first storing unit as a log.

13. The memory system according to claim 11, wherein
the first address translation table includes a forward lookup table for searching for first information that indicates a storing position in the second management storage area of the data in second management units corresponding to a logical address in second management units and second information that indicates a storing position in any one of the first management storage area and the third management storage area of data in first management units included in the logical address in second management units, from the logical address in second management units,
the second address translation table includes a reverse lookup table for searching for an address in first management units corresponding to data in first management units included in a logical block corresponding to a logical block address, from the logical block address belonging to any one of the first management storage area and the third management storage area, and
the log control unit, when an event occurs so that the master table needs to be updated, stores difference information before and after update of the second address translation table stored in the first storing unit, in the first storing unit as a log.

14. The memory system according to claim 12, wherein the log control unit, when storing the difference information before and after update of the second address translation table in the first storing unit as the log, stores difference information before and after update of reverse lookup information corresponding to the first information of the first address translation table in the first storing unit as a log.

15. The memory system according to claim 13, wherein the log control unit, when storing the difference information before and after update of the second address translation table in the first storing unit as the log, stores difference information before and after update of reverse lookup information corresponding to the first information of the first address translation table in the first storing unit as a log.

16. The memory system according to claim 1, wherein
the first storing unit is a dynamic random access memory, and
the second storing unit is a NAND-type flash memory.

17. The memory system according to claim 16, wherein the NAND-type flash memory is capable of storing information of two or more bits in one memory cell.

18. A method of controlling a memory system that includes a volatile first storing unit and a nonvolatile second storing unit, the method comprising:
storing a master table in the first storing unit, the storing the master table including:
storing a first address translation table for managing forward lookup information that correlates a logical address specified from a host apparatus with a storing position in the second storing unit, in the second storing unit, and
a second address translation table for managing reverse lookup information that correlates the storing position in the second storing unit with the logical address specified from a host apparatus, in the second storing unit;
storing, when an event occurs so that the master table needs to be updated, difference information before and after update of any one of the first address translation table and the second address translation table as a log in the first storing unit; and
storing the log stored in the first storing unit in the second storing unit and incorporating the log stored in the first storing unit into the master table to update both of the first address translation table and the second address translation table, when a first condition is satisfied.

19. The method according to claim 18, wherein the first condition includes at least one of a case in which an amount of the log reaches a specific threshold and a case when update of data becomes stable.

20. The method according to claim 18, further comprising:
storing, when a second condition is satisfied, the master table in the second storing unit as a snapshot and at a time of start-up of the memory system, transferring the snapshot stored in the second storing unit to the first storing unit; and
restoring, when detecting that the log stored in the second storing unit is new compared with the snapshot, the master table by using the log stored in the second storing unit at a time of start-up of the memory system.

21. The method according to claim 20, wherein the second condition includes at least one of a case in which a normal power-off sequence occurs and a case in which a storage area for the log becomes insufficient on the first storing unit.

* * * * *